(12) United States Patent
Drangmeister et al.

(10) Patent No.: US 12,217,317 B2
(45) Date of Patent: Feb. 4, 2025

(54) METHODS AND SYSTEMS FOR EFFICIENT DELIVERY OF ACCOUNTING AND CORPORATE PLANNING SERVICES

(71) Applicant: FIN BOX TECHNOLOGIES, INC., Albuquerque, NM (US)

(72) Inventors: Walter Drangmeister, Albuquerque, NM (US); R. Blake Ridgeway, Albuquerque, NM (US)

(73) Assignee: FIN BOX TECHNOLOGIES, INC., Albuquerque, NM (US)

( * ) Notice: Subject to any disclaimer, the term of this patent is extended or adjusted under 35 U.S.C. 154(b) by 432 days.

(21) Appl. No.: 17/843,806

(22) Filed: Jun. 17, 2022

(65) Prior Publication Data
US 2022/0327635 A1 Oct. 13, 2022

Related U.S. Application Data

(63) Continuation-in-part of application No. 17/005,274, filed on Aug. 27, 2020, now Pat. No. 11,393,045,
(Continued)

(51) Int. Cl.
G06Q 40/12 (2023.01)
G06Q 10/0637 (2023.01)
G06Q 10/067 (2023.01)

(52) U.S. Cl.
CPC ......... *G06Q 40/12* (2013.12); *G06Q 10/0637* (2013.01); *G06Q 10/067* (2013.01)

(58) Field of Classification Search
CPC .. G06Q 40/12; G06Q 10/0637; G06Q 10/067; G06N 20/00
See application file for complete search history.

(56) References Cited

U.S. PATENT DOCUMENTS 6,343,275 B1 * 1/2002 Wong ................. G06Q 30/0201
705/7.29
7,778,895 B1 * 8/2010 Baxter ................ G06Q 40/123
705/30
(Continued)

FOREIGN PATENT DOCUMENTS

JP 2001527248 A * 12/2001
WO WO-2011008186 A1 * 1/2011 ............. G06Q 10/10

OTHER PUBLICATIONS

Lemaire-Harvey, B., & Harvey, D. A. (2020). RPA internal controls support audit readiness. The Journal of Government Financial Management, 69(2), 60-62. Retrieved from https://www.proquest.com/scholarly-journals/rpa-internal-controls-support-audit-readiness/docview/2428566616/se-2 (Year: 2020).*
(Continued)

*Primary Examiner* — Ashford S Hayles
(74) *Attorney, Agent, or Firm* — V Gerald Grafe; Anand Chellappa

(57) ABSTRACT

Methods and systems for providing accounting services and corporate strategic planning services that comprise processing and aggregating financial transaction data and a plurality of input variables for maintaining a subscriber's general ledger, outputting audit ready financial reports, providing strategic planning inputs and by using at least one of semi-automated and machine learning algorithms are disclosed.

26 Claims, 15 Drawing Sheets

Figure 1:
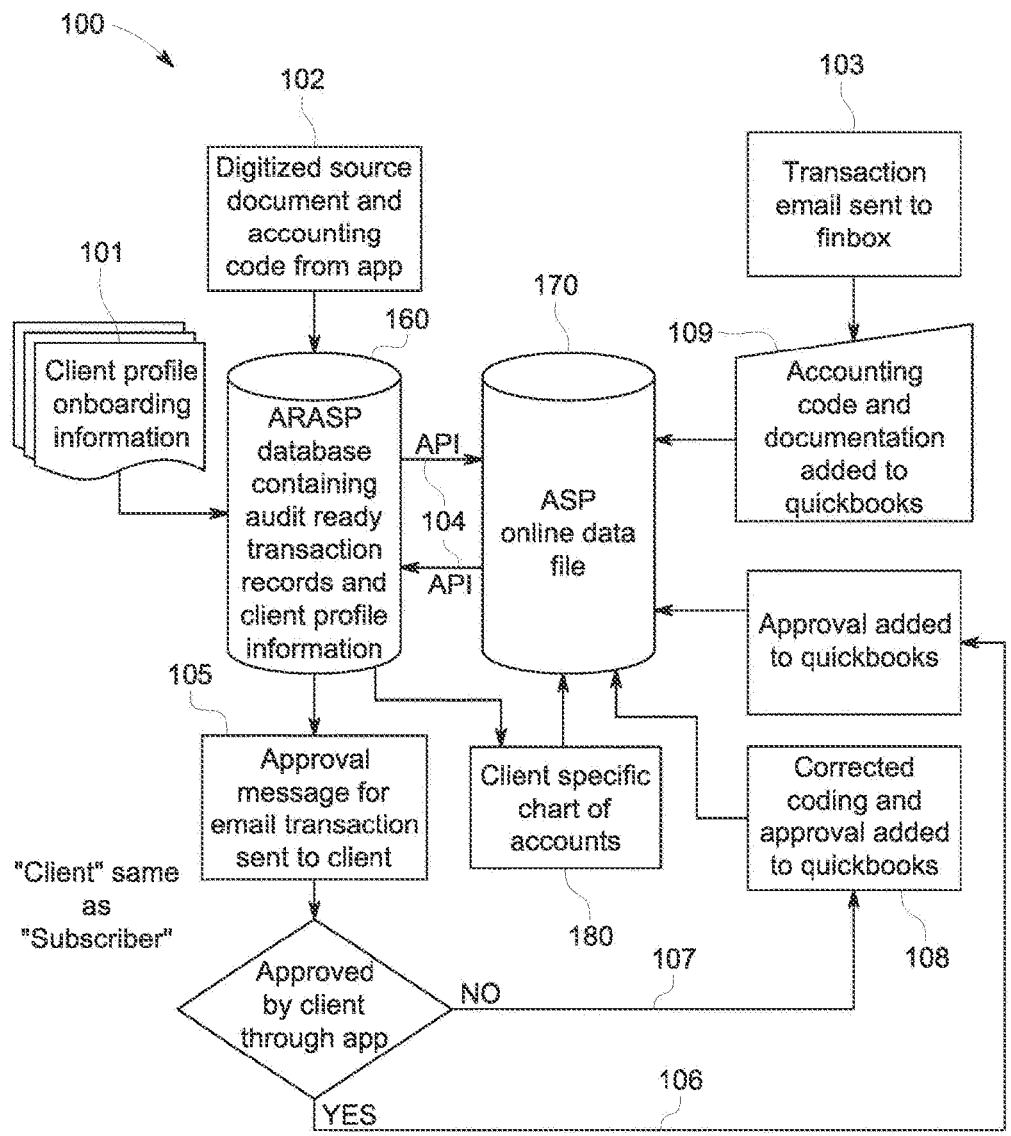

Related U.S. Application Data which is a continuation-in-part of application No. 16/018,070, filed on Jun. 26, 2018, now Pat. No. 10,803,533.

(60) Provisional application No. 62/670,873, filed on May 14, 2018, provisional application No. 62/525,200, filed on Jun. 27, 2017.

(56) References Cited

U.S. PATENT DOCUMENTS

| | | | | |
|---|---|---|---|---|
| 8,271,326 | B1* | 9/2012 | Brunet | G06Q 30/0214 705/14.16 |
| 8,307,109 | B2* | 11/2012 | Mamou | G06F 16/254 709/232 |
| 9,009,070 | B2* | 4/2015 | Young | G06Q 40/02 705/16 |
| 9,117,208 | B2 | 8/2015 | Drury et al. | |
| 9,208,528 | B2* | 12/2015 | Chelst | G06Q 40/12 |
| 10,140,665 | B1* | 11/2018 | Lipstein | G06Q 40/12 |
| 2002/0138376 | A1* | 9/2002 | Hinkle | G06Q 40/03 705/30 |
| 2002/0156733 | A1* | 10/2002 | Shimada | G06Q 10/06 705/42 |
| 2003/0144932 | A1* | 7/2003 | Martin | G06Q 40/02 705/32 |
| 2003/0225638 | A1* | 12/2003 | Secola | G06Q 40/12 705/30 |
| 2003/0225692 | A1* | 12/2003 | Bosch | G06Q 40/00 705/42 |
| 2004/0064340 | A1* | 4/2004 | Johnston | G06Q 10/10 705/311 |
| 2004/0088313 | A1* | 5/2004 | Torres | G06F 16/93 |
| 2004/0143522 | A1* | 7/2004 | Wall | G06Q 40/02 705/34 |
| 2004/0199445 | A1* | 10/2004 | Eder | G06Q 40/03 705/35 |
| 2005/0044015 | A1* | 2/2005 | Bracken | G06Q 40/12 705/30 |
| 2005/0097014 | A1* | 5/2005 | Ebert | G06Q 40/02 705/30 |
| 2005/0144096 | A1* | 6/2005 | Caramanna | G06Q 40/06 705/30 |
| 2005/0289025 | A1* | 12/2005 | Fredericks | G06Q 10/10 705/30 |
| 2006/0106688 | A1* | 5/2006 | Greenaae | G06Q 40/00 705/30 |
| 2007/0094088 | A1* | 4/2007 | Mastie | G06Q 20/20 705/24 |
| 2010/0280962 | A1* | 11/2010 | Chan | G06Q 10/10 705/301 |
| 2011/0119107 | A1* | 5/2011 | King | G06Q 10/0639 705/7.28 |
| 2011/0238430 | A1* | 9/2011 | Sikorski | G06Q 10/10 705/1.1 |
| 2012/0047052 | A1* | 2/2012 | Patel | G06Q 40/10 705/30 |
| 2012/0259748 | A1* | 10/2012 | Young | G06Q 40/02 705/34 |
| 2013/0036073 | A1* | 2/2013 | Kiger | G06Q 40/06 705/36 R |
| 2013/0054431 | A1* | 2/2013 | Forman | G06Q 40/00 705/30 |
| 2013/0226750 | A1* | 8/2013 | Friedholm | G06Q 10/1057 705/34 |
| 2013/0232043 | A1* | 9/2013 | Patel | G06Q 30/04 705/34 |
| 2013/0297700 | A1* | 11/2013 | Hayton | G06Q 10/10 709/204 |
| 2014/0067568 | A1* | 3/2014 | Argue | G06Q 10/08 705/28 |
| 2014/0101062 | A1* | 4/2014 | Beigel | G06Q 30/018 705/317 |
| 2014/0156806 | A1* | 6/2014 | Karpistsenko | G06Q 10/06 709/219 |
| 2014/0188673 | A1* | 7/2014 | Graham | G06Q 40/10 705/30 |
| 2014/0358745 | A1* | 12/2014 | Lunan | G06Q 40/12 705/30 |
| 2015/0012399 | A1* | 1/2015 | Ceribelli | G06Q 50/01 705/34 |
| 2015/0026021 | A1* | 1/2015 | Khan | G06Q 10/0637 705/30 |
| 2015/0058092 | A1* | 2/2015 | Rea | G06Q 10/0639 705/7.38 |
| 2015/0120395 | A1* | 4/2015 | Bellini, III | G06Q 10/0637 705/7.36 |
| 2015/0324930 | A1* | 11/2015 | Abernethy | G06Q 40/12 705/30 |
| 2015/0332277 | A1* | 11/2015 | Bhosale | G06Q 40/00 705/317 |
| 2016/0042469 | A1* | 2/2016 | Lochrie | G06F 16/285 705/30 |
| 2016/0063446 | A1* | 3/2016 | Shaaban | G06Q 30/04 705/32 |
| 2016/0104252 | A1* | 4/2016 | Simpson | G06Q 40/128 705/33 |
| 2016/0125511 | A1* | 5/2016 | Shaaban | G06Q 30/0635 705/26.81 |
| 2016/0321673 | A1* | 11/2016 | Kallman | G06Q 30/01 |
| 2017/0270432 | A1* | 9/2017 | Sachdev | G06Q 10/067 |
| 2017/0353477 | A1* | 12/2017 | Faigon | G06F 21/554 |
| 2018/0012268 | A1* | 1/2018 | Simantov | G06N 20/00 |
| 2018/0025340 | A1* | 1/2018 | Schlosser | G06Q 50/12 705/24 |
| 2018/0040064 | A1* | 2/2018 | Grigg | H04L 41/145 |
| 2019/0392410 | A1* | 12/2019 | Ceribelli | G06Q 20/0425 |
| 2020/0279015 | A1* | 9/2020 | Lu | G06Q 10/067 |
| 2020/0387976 | A1* | 12/2020 | Bull | G06Q 20/14 |
| 2021/0035116 | A1* | 2/2021 | Berrington | G06N 5/04 |

OTHER PUBLICATIONS

Stein Smith, Sean. Blockchain, Artificial Intelligence and Financial Services: Implications and Applications for Finance and Accounting Professionals. 1st ed. 2020. Cham: Springer International Publishing, 2020. Web. (Year: 2020).*

Gotthardt, Max et al. "Current State and Challenges in the Implementation of Smart Robotic Process Automation in Accounting and Auditing." ACRN journal of finance and risk perspectives 9.1 (2020): 90-102. Web. (Year: 2020).*

Y. Zhang, F. Xiong, Y. Xie, X. Fan and H. Gu, "The Impact of Artificial Intelligence and Blockchain on the Accounting Profession," in IEEE Access, vol. 8, p. 110461-110477, 2020, doi: 10.1109/ACCESS.2020.3000505. (Year: 2020).*

MIT Sloan Management Review; Paul Michelman, "10 A New Approach to Automating Services," in How to Go Digital: Practical Wisdom to Help Drive Your Organization's Digital Transformation , MIT Press, 2018, pp. 81-103. (Year: 2018).*

* cited by examiner

| Onboarding |
|---|
| |
| Founder/Key Contact Information |
| Name |
| Address |
| Social Security Number |
| Cell Phone Number |
| Other Phone Number |
| Business email address |
| Other email address |
| Other email address |
| |
| Corporation |
| Articles of Formation or Articles of Organization |
| Organizational Minutes and Bylaws |
| Shareholder Agreement |
| Share Certificate or Accounting |
| |
| Limited Liability Company (LLC) |
| Articles of Formation or Articles of Organization |
| Operating Agreement |
| Member Certificate or Accounting |
| |
| Partnership |
| Partnership Agreement |
| |
| Taxation and Related Registration Numbers |
| Federal Employer Identification Number (EIN) |
| New Mexico CRS-1 Number |
| New Mexico UI Number (Unemployment Insurance) |
| State Certificate of Organization |
| |
| Financial Accounts Information |
| |
| Bank Account Information |
| Login, Password, Account Number, ID questions |
| |
| Company Credit Card Account Information |
| Login, Password, Account Number, ID questions |
| |
| Any Existing Accounting Records (online/manual) |

A

FIG. 3A

| Additional Shareholders, Members, Partners |
|---|
| Name |
| Address |
| Social Security Number |
| Cell Phone Number |
| Other email address |
| Business email address |
| other email address |
| |
| Vendors/Subcontractors |
| Vendor list setup |
|   address |
|   email address |
|   phone number |
|   contract |
| W-9 for vendors needing 1099s |

FIG. 3A Continued

Daily Processing

Accountant Tasks

*Bank Account*
- Upload online transactions from Bank Account
- Enter Invoices from Email (accounting, vendor, documentation) for Bank Account
- Review Any App Transactions and Add any Exceptions to Supervisor Report
- Match Transactions for Bank Account
- Recode Account Number and Enter Invoices for any "Ask My Accountant" Bank Account transactions received
- Match Transactions for Bank Account
- Place Any "Add" Transactions for Bank Account in "Ask My Accountant" and Add to Supervisor Report
- Send Bank Account Supervisor Report
- Enter any customer payments received

*Credit Card Account (Not Reimburse Me Now)*
- Upload online transactions from Credit Card Account
- Enter Invoices from Email (accounting, vendor, documentation) for Credit Card Report
- Review Any App Transactions and Add any Exceptions to Supervisor Report
- Match Transactions for Credit Card Report
- Recode Account Number and Enter Invoices for any "Ask My Accountant" Credit Card Account transactions received
- Match Transactions for Credit Card Account
- Place "Add" Transactions for Credit Card Account Older Than One Day in "Ask My Accountant" and Add to Supervisor Report
- Send Credit Card Supervisor Report

⎫
⎬ A
⎭

FIG. 3B

| Monthly Processing |
|---|
| |
| Reconcile Bank Account and Produce Reconciliation Report |
| Reconcile Credit Card Account and Produce Reconciliation Report |
| Prepare Monthly Reports per Client Profile |
| Message Client That Reports are Completed and Include Link to Reports |
| Prepare and Submit Monthly CRS-1 Report for NM Gross Receipts Tax |
| Make sure QBO send all necessary payroll tax filings/payments |

FIG. 3C

METHODS AND SYSTEMS FOR EFFICIENT DELIVERY OF ACCOUNTING AND CORPORATE PLANNING SERVICES

CROSS REFERENCE TO RELATED APPLICATIONS

This application is a Continuation in Part of U.S. patent application Ser. No. 17/005,274 filed Aug. 27, 2020 and titled "METHODS AND SYSTEMS FOR EFFICIENT DELIVERY OF ACCOUNTING AND CORPORATE PLANNING SERVICES," which is a Continuation in Part of U.S. patent application Ser. No. 16/018,070 filed Jun. 26, 2018, and titled "Methods and systems for efficient delivery of accounting and corporate planning services," which is related to and claims the benefit of and priority to U.S. Provisional Appl. No. 62/525,200, filed Jun. 27, 2017, and titled "Methods and Systems for Automated Bookkeeping and Financial Services," and U.S. Provisional Appl. No. 62/670,873, filed May 14, 2018, and titled "Methods and Systems for Efficient Delivery of Accounting and Corporate Planning Services," the disclosures of which are hereby incorporated herein by reference in their entireties.

FIELD

The present invention relates to methods and systems for providing accounting services and corporate strategic planning services using at least one of semi-automated and machine learning algorithms.

BACKGROUND

Most startup companies and small to medium sized business enterprises (SME) struggle with financial accounting, and in particular, find it difficult to retain affordable and high-quality bookkeeping and financial management services. Most entrepreneurs resort to the "do it yourself" approach to their company's accounting. Accounting software providers ("ASP"), such as QuickBooks and Xero, provide local or cloud-based software which require the user to manually input their company's expenses, prepare invoicing, manage accounts receivable (A/R), manage employee payroll, track payments to vendors and manage accounts payable (A/P). Because the entrepreneur often has little or no formal training in accounting, expenses and or payments may be misallocated and not treated appropriately for tax purposes, financial planning and corporate strategy purposes. Managing employees, state and local taxes, investment transactions, and capital purchases are particularly problematic for most startups and many SME's. Frequent reviews by an experienced bookkeeper or certified public accountant is often needed, but not always available. A method of delivering accounting services that is both efficient, audit ready, and inexpensive is needed.

U.S. Pat. No. 9,117,208 (assigned to Xero Ltd.) describes an online accounting software that enables small business customers with the ability to manage their accounts within a cloud. Users are able to access a secure online web site, review, and update their data. Customers can invite trusted advisors e.g., accountants, bookkeepers, their bank manager, and/or their business partner into their accounts. Disclosed are example systems and methods by which a financial institution that holds a business's financial data can share this financial data with an accounting software system (e.g., a hosted online accounting software solution) for the benefit of their customers, via automated provisioning. The system may include an accounting and payroll module, a community module, a billing/subscription management module, a notifications center module, a user profile management module, and an analytics module. An accountant may create and generate standardized sets of reports such as profit and loss statement and quarterly reports. The accounting and payroll module may access banking data for each client business. The banking data may be imported either through a bank feed or a user or accountant created document. The accounting and payroll module may also communicate with third-party tools via an application programming interface ("API").

U.S. Pat. Pub. No. 2012/259748 (assigned to Microsoft, Inc.) describes a mobile phone application to capture key expense information and/or associated receipts for expense reporting purposes. The expense information and/or receipts may then be sent to the employee's company expense management application, which may be part of a ERP ("Enterprise Resource Planning") service, through a mobile phone data connection. The receipts and information may be available when the employee completes his or her expense report. This helps the employee to easily capture the information on the go without needing to keep track of paper receipts or amounts paid in cash. The application provides an integrated and automated user experience, integration with a mobile device's camera or attached scanner module to capture a receipt, local storage of expense information and receipts at an offline data store, ability to send the expense information and receipts to a cloud-based ERP service using a defined interface, and authentication and/or identity protection services.

U.S. Pat. Pub. No. 2015/026021 describes a reporting system and method for collecting and processing of transactional and financial data and non-transactional data to provide an effective tool for overseeing the on-going operations of an enterprise and for integrating cash sheet management with an accounting and payroll system in a cloud-based computing network. The system receives data, processes data, communicates data, and/or provide reports in real-time. It also provides an option for inputting purchases/expenses occurring at the point of sale into the cloud-based system along with a copy of invoices/receipts, which may then be automatically posted within an accounts component or module.

Crunchbase, Inc. (Brandenburg, Germany) reports that a system called SMACC uses artificial intelligence and machine learning technology to extract relevant data from a customer's scanned invoices and receipts and to do bookkeeping automatically. Financial documents are digitized, automatically organized, and securely archived in data centers. Customers can access their documents from any device using their account credentials and may grant access to accountants, business partners, and employees. The system purports to recognize multiple data points including, payment terms, tax information, address data, and descriptions and amounts of products and services invoiced on bills and receipts. The information is reported to be used to automatically start financial workflows including bill approvals, digital payments, and financial controlling. Based on the recognized invoice or collected document information, the software system can purportedly allocate financial accounts, cost centers, and project centers to every item on your bill. The system learns from inputs provided by accountants and financial accountants to ensure highest quality and accuracy. The system purports to provides for transparency and access to real-time financial data. Automated data processing provides daily insights a customer's business's financial performance. The system generates real-time reports of revenues, expenses and operational profitability. All data is directly linked to the corresponding invoices, receipts and payment transactions. All financial supplier and customer data is automatically aggregated and made available in a mobile application software ("app").

SmartVault Corp. provides an accounting documentation software that facilitates the storage of source documents across many online applications. SmartVault is primarily used by accountants who use ASP software such as Quickbooks, Xero, and Freshbooks. The software may also be used by business entities that need document management capabilities. ApprovalMax is a multi-layered accounting approval solution. It is more applicable to organizations in which multiple and often different layers of approval are required for transactions of different sizes and types. These products and many others offered by financial technology companies address one aspect or another from the ensemble of financial activities that are normally associated with the provision of accounting services, and often replace older, slower, and more manual processes with a more modern digital service. Systems and methods that comprise a user-friendly app, one or more dedicated accountants, and a robust process that allows for audit ready accounting of a wide range of transactions are required.

The systems and methods described herein allow subscribers to enter financial transactions along with supporting documentation in substantially real-time relative to the occurrence of a business event or expense. The app is preferably linked to an ASP software such as QuickBooks via an API. In addition, provided is an e-mail processing feature that allows subscribers to forward e-mail receipts and invoices to an audit ready accounting service provider ("ARASP"), which are then recorded and documented by accountants. Audit-ready financial data may then be aggregated with sales, R&D roadmap, product roadmap, market data and may be used to assist with the subscriber's corporate strategic planning initiatives.

In this disclosure, "real-time" generally means "the actual time during which a process or event occurs or virtually immediately as a process or event occurs." Further, "audit readiness" links business activities to accounting transactions and ensures that the accounting transactions are properly reported in the financial records with required supporting documentation. Audit readiness improves the quality of financial information, leading to better data for decision-making.

BRIEF DISCLOSURE

Disclosed is an exemplary method for providing accounting services by an accounting service provider to a subscriber, the method comprising providing a first accounting application software having a business model identification engine and configured to communicate with a first database for storing subscriber specific onboarding data and transactional data wherein the business model identification engine is configured to assign one or more business models selected from a set of standard business models to the subscriber, providing a second accounting application software configured to communicate and synchronize with a second database for storing subscriber specific transactional data and wherein the first and second databases communicate and synchronize with each other through an API provided by the first software, assigning one or more business models to the subscriber by processing subscriber specific onboarding data using the business model identification engine wherein each business model is associated with a model specific chart of accounts and a model specific accounting transaction guidance, inputting subscriber specific transactional data to at least one of the model specific chart of accounts using the first accounting software, and the second accounting software, processing subscriber specific transactional data using the first accounting application software wherein the processing step comprises routing transactional data through at least one of an accounting playbook module customized to the one or more assigned business models, an AI/ML learning module, an accountant review module, and a supervisory review module, assigning an accounting code for each subscriber specific transaction and flagging each transaction for further oversight review using at least one of the accountant module and the supervisory review module based on at least one of materiality factor and statistical error associated with the coding assignment; and, outputting audit-ready financial reports comprising at least one of P&L statement, balance sheet, cash flow statements, A/P summary, and A/R summary.

The subscriber specific onboarding data may comprise at least one of subscriber responses to a structured set of questions and a set of sample transactional data provided by the subscriber. The assigning one or more business models step may comprise at least one of examining the responses provided by the subscriber and selecting one or more business models from a standard set of business models provided by the business model identification engine, and comparing the sample transactional data with at least one of transactional data of other subscribers and one or more predetermined sets of reference transactional data to which one or more reference business models have been previously assigned and selecting one or more business models that correlate with the reference business models. The comparing step may be performed using machine learning methods. The step of reviewing the one or more selected models by an expert associated with the audit ready accounting service provider may be performed prior to assigning the one or more models to the subscriber. The the set of standard business models may comprise at least one of fee for time (service), flat fee (service), value-added reseller, retail online, retail fixed location(s), manufacturer, software developer, contract research and development, mining and resource exploration, aggressive growth commodity type products/services to numerous markets, aggressive growth via price competitive new products/service to large customers, aggressive growth with narrow special products/services, controlled growth with broad product/services range to many markets, controlled growth via premium priced products/services, limited growth in small niches offering superior product/service, average growth via steady development of new channels, brand identification and heavy promotion, and limited growth selling infrequently purchased products/services to numerous markets.

The exemplary methods may further comprise the step of periodically evaluating the subscriber's transactions to assess whether the one or more business models assigned to the subscriber during onboarding are still relevant to the subscriber or if a new business model is required. The first accounting application software and second application software may be synchronized at subscriber specific predetermined intervals. The first accounting application software and second application software may be synchronized by a trigger from one of the accounting playbook module, the AI/ML learning module, the accountant review module, and the supervisory review module. The trigger may be initiated by a client specific accounting coding change. The accounting playbook module may implement at least one of assigning an accounting code for a subscriber specific transaction, adding transactional coding details, assigning a materiality factor for each transaction, estimating a reliability of coding coefficient for each transaction, and estimating a materiality adjusted coding coefficient based on statistical errors associated with each accounting code.

The AI/ML module may implement at least one of assigning an accounting code for a subscriber specific transaction, adding transactional coding details, assigning a materiality factor for each transaction, estimating a reliability of coding coefficient for each transaction, and estimating a materiality adjusted coding coefficient based on statistical errors associated with each accounting code. The accountant review module may implement at one of assigning an accounting code for a subscriber specific transaction, adding transactional coding details, assigning a materiality factor for each transaction, estimating a reliability of coding coefficient for each transaction, and estimating a materiality adjusted coding coefficient based on statistical errors associated with each accounting code. The supervisory review module may implement at one of assigning an accounting code for a subscriber specific transaction, adding transactional coding details, assigning a materiality factor for each transaction, estimating a reliability of coding coefficient for each transaction, and estimating a materiality adjusted coding coefficient based on statistical errors associated with each accounting code. The materiality adjusted coding coefficient for each subscriber specific transaction coding originating from at least one of the accounting playbook module, an AI/ML learning module, an accountant review module, and a supervisory review module may be examined to decide whether a coding change is required. The subscriber specific transaction account coding may be flagged for further review by the at least one of the accountant module and the supervisory module based on at least one of high materiality and low assigned coding keep rates related to that transaction.

The subscriber specific transactional data coding may comprise at least one of account class comprising at least one of asset, liability, owner's equity, and revenue expense, account number, amount, account class validation based on a preliminary examination against memorized transactions stored in the first database, account number validation based on a preliminary examination against memorized transactions stored in the first database, and, amount validation based on a preliminary examination against memorized transactions stored in the first database. The inputting subscriber specific transactional data step may comprise at least one of inputting invoices attached to e-mails related to corporate expenses, expense information captured by a subscriber using a camera of a smart device to provide a digitized source document, transactional information generated by each subscriber associated with a subscriber and transmitted by at least one of credit/debit card magstripe readers and point of sale contactless readers in the form of at least one of an e-mail directed to a subscriber e-mail account and directly to a subscriber's credit card account or bank account, credit/debit card statements associated with each credit card associated with a subscriber, bank statements associated with each subscriber account, payroll data related to each subscriber, and ASP accounting system memorized transactions. The subscriber specific payroll data and memorized transactional data may be input into the ASP database and synchronized with the ARASP database. The accountant review module may implement oversight review by at least one of an accountant and bookkeeper retained by the ARASP provider.

Disclosed is an exemplary system for providing accounting service by an accounting service provider to a subscriber comprising an electronic device configured to run a first accounting software having a business model identification engine and configured to receive subscriber specific transactional data wherein the first software processes subscriber specific transactional data using at least one an accounting playbook module, an AI/ML learning module, an accountant review module, and a supervisory review module and wherein the business model identification engine is configured to assign one or more business models selected from a set of standard business models to the subscriber, a first database for storing subscriber specific onboarding data and transactional data and configured to communicate with the first accounting software, and a second database for storing subscriber specific transactional data and configured to communicate with a second accounting software wherein the first and second databases communicate with each other through an API provided by the first software wherein the first and second databases are synchronized at predetermined intervals using the API, subscriber specific transactional data is inputted to at least one of the model specific chart of accounts using the first accounting software, and the second accounting software, at least one of the accountant module and the supervisory oversight review module is used to review transactions flagged for review based on at least one of materiality factor and statistical error associated with the coding of a transaction, and the first accounting software is configured to output audit-ready financial reports comprising at least one of P&L statement, balance sheet, cash flow statement, A/P summary, and A/R summary.

at least one of the accountant module and the supervisory oversight review module is used to review transactions flagged for review based on at least one of materiality factor and statistical error associated with the coding of a transaction, and the first accounting software is configured to output audit-ready financial reports comprising at least one of P&L statement, balance sheet, cash flow statement, A/P summary, and A/R summary. Each business model may be associated with a model specific chart of accounts and model specific accounting transaction guidance. The accounting playbook module may be customized to the one or more business models assigned by the business model identification engine. The electronic device may comprise at least one of a smart device, a laptop computer, and a desktop computer. The first database may comprise at least one of a relational database, NoSQL database, flat files, structured database, and any other machine-readable database. The second database may comprise at least one of a relational database, NoSQL database, flat files, structured database, and any other machine-readable database.

Other features and advantages of the present disclosure will be set forth, in part, in the descriptions which follow and the accompanying drawings, wherein the preferred aspects of the present disclosure are described and shown, and in part, will become apparent to those skilled in the art upon examination of the following detailed description taken in conjunction with the accompanying drawings or may be learned by practice of the present disclosure. The advantages of the present disclosure may be realized and attained by means of the instrumentalities and combinations particularly pointed out in the appendant claims.

DRAWINGS

The foregoing aspects and many of the attendant advantages of this disclosure will become more readily appreciated as the same becomes better understood by reference to the following detailed description, when taken in conjunction with the accompanying drawings, wherein:

FIG. 1. Schematic flow diagram showing an exemplary method for providing audit-ready accounting services.

FIGS. 2A, 2B, 2C, and 2D depict a front view of the home screen (or splash screen) of an exemplary app on a mobile device, front view of a menu screen of an exemplary app on a mobile device related to credit card transactions, front view of a menu screen of an exemplary app on a mobile device related to a bill, and front view of menu screen of an exemplary app on a mobile device related to message threads between the user and the one or more databases linked to the app or between the user and an accountant, respectively.

Figure 3A:
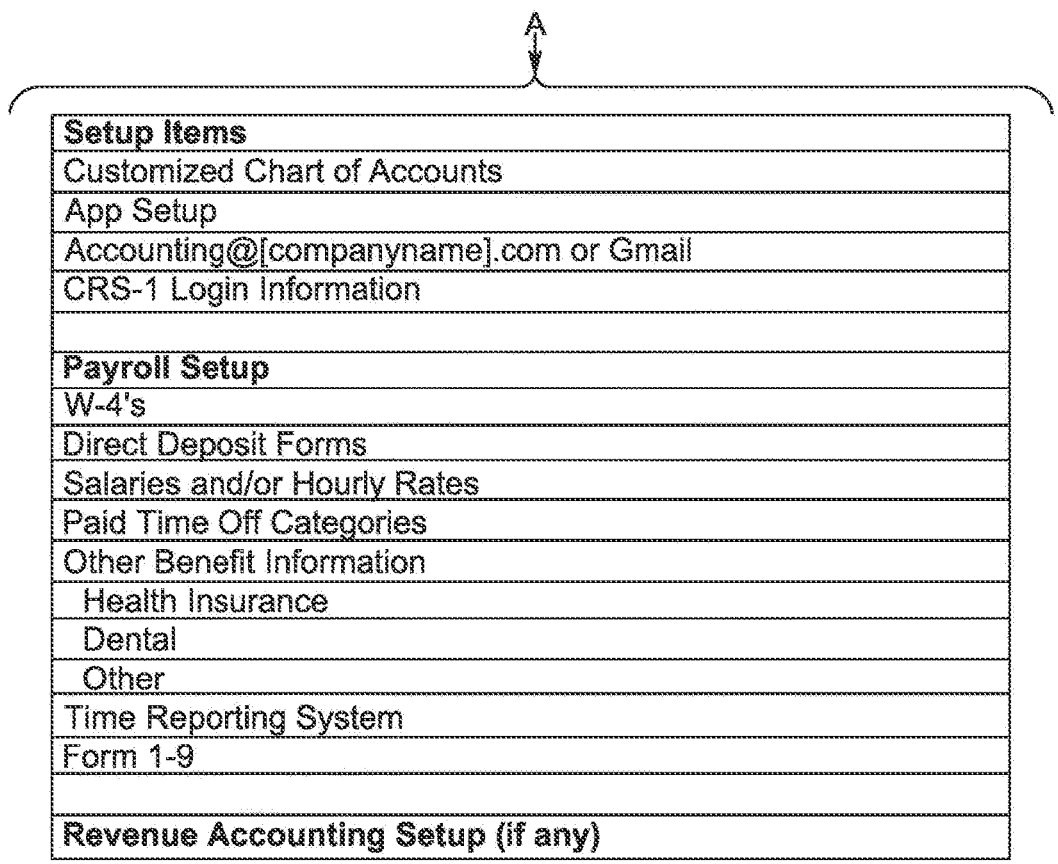
Figure 3B:
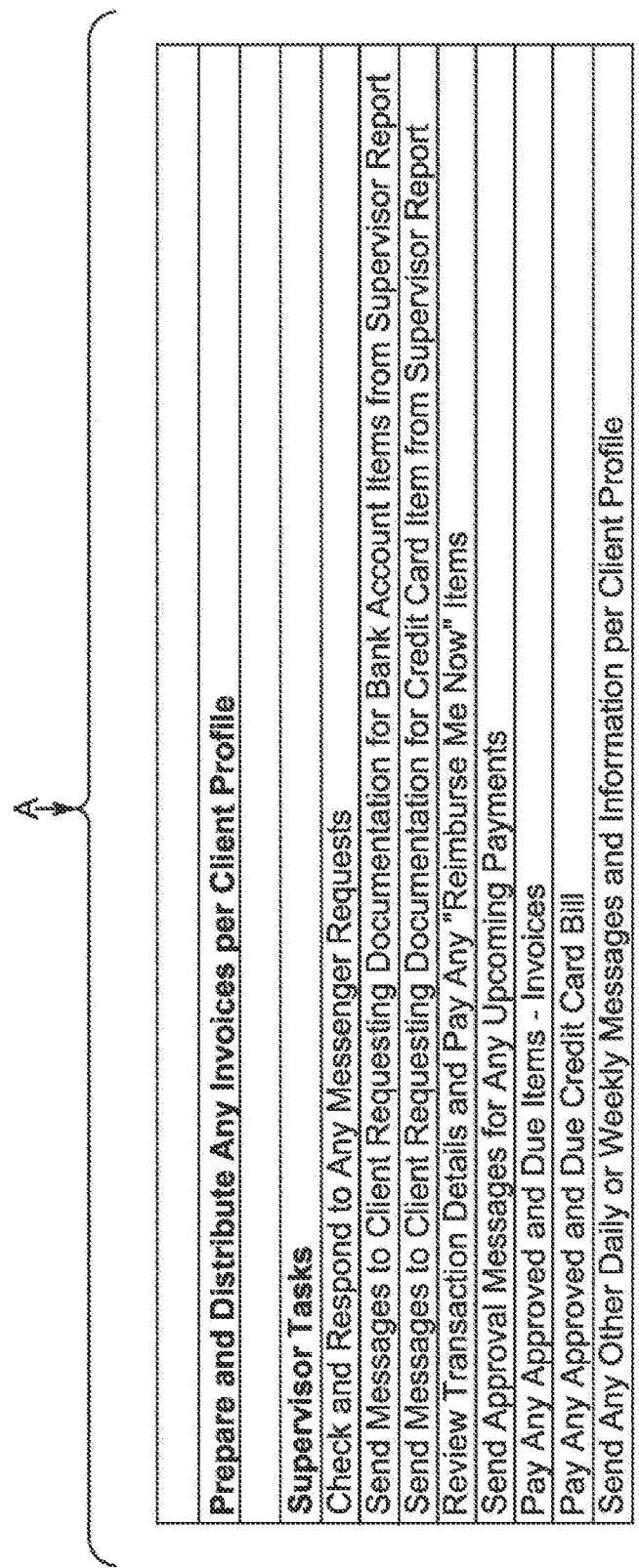

FIGS. 3A, 3B, and 3C depict a schematic diagram showing an exemplary task list related to onboarding a new subscriber and users associated with subscriber, schematic diagram showing an exemplary task list related to daily processing of financial transaction related to a user, and schematic diagram showing an exemplary task list related to monthly processing of financial transactions, respectively.

Figure 4:
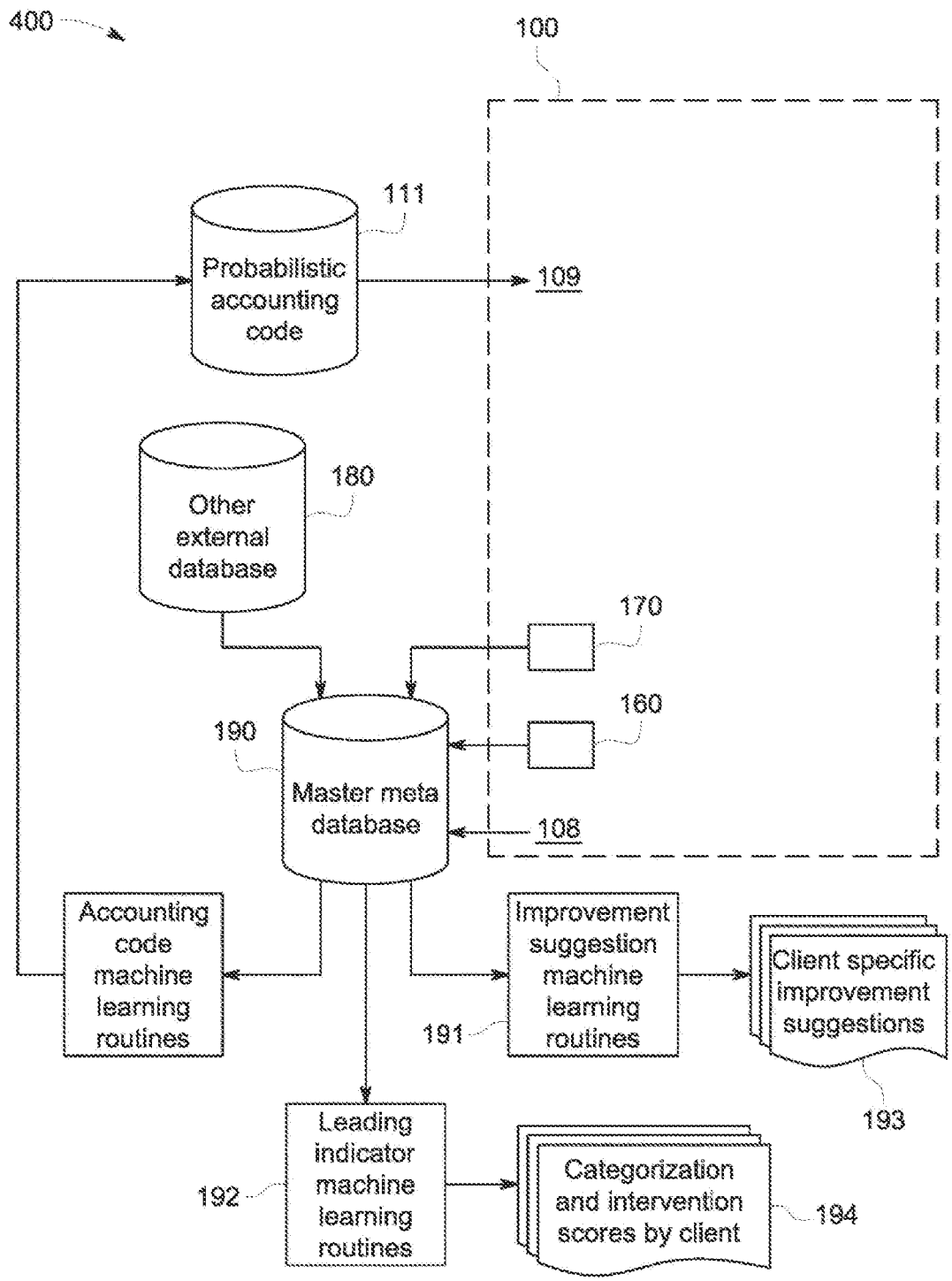

FIG. 4. Schematic flow diagram showing an exemplary method for providing outputs that relate to corporate strategy using a plurality of inputs including accounting data.

Figure 5A:
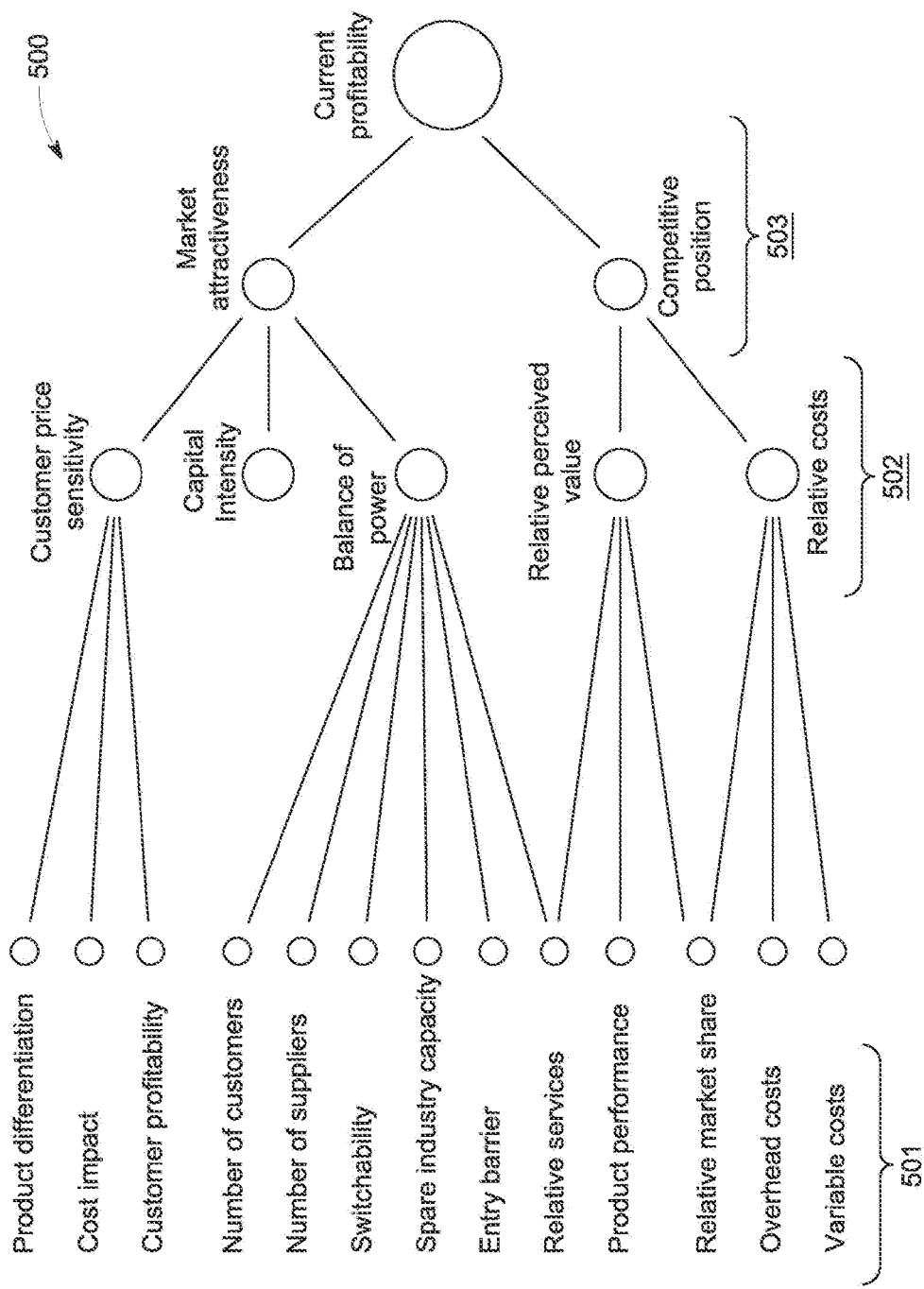
Figure 5B:
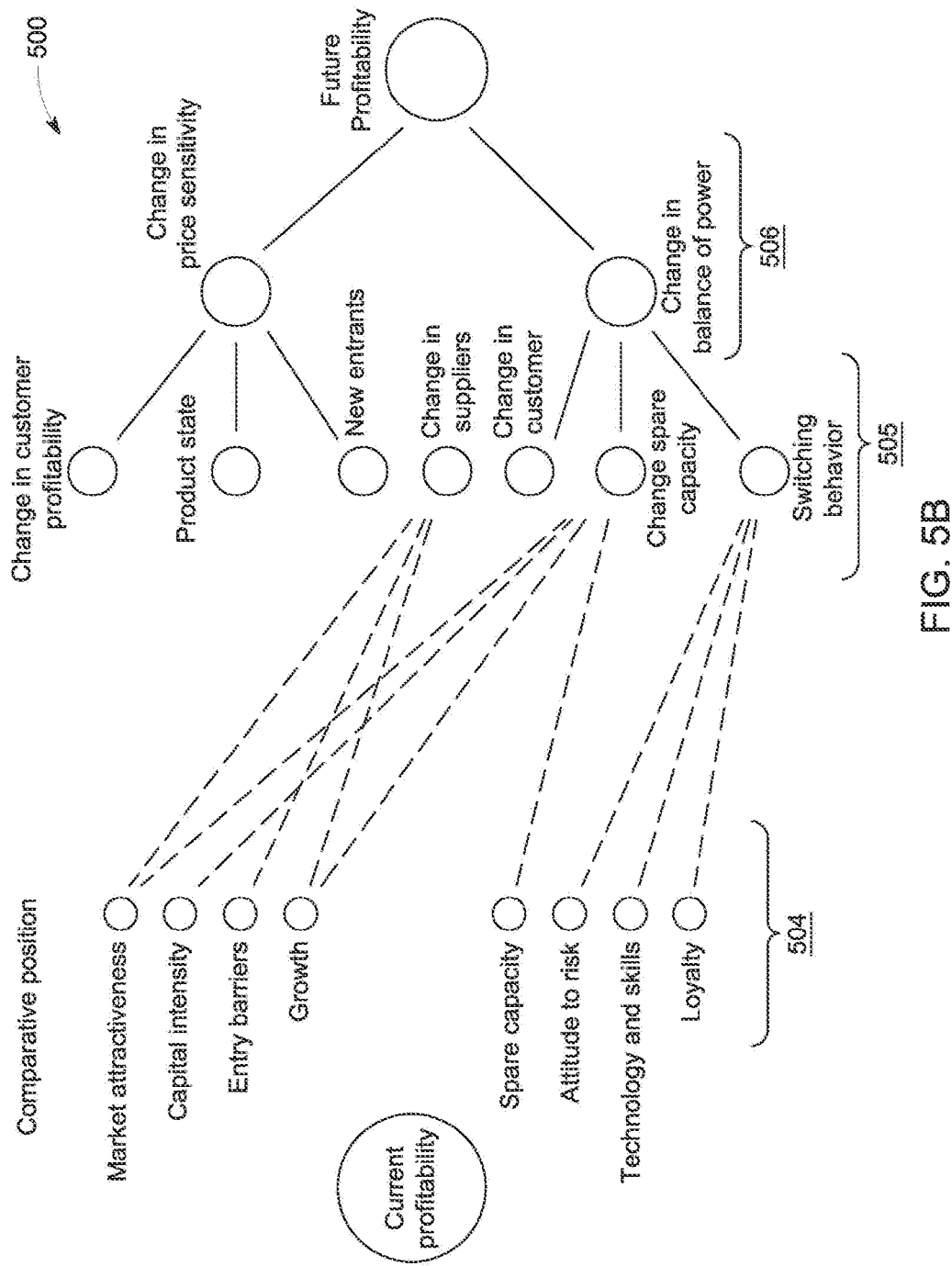

FIGS. 5A and 5B depict a schematic drawing showing a machine learning work flow related to current profitability of a subscriber, and a schematic drawing showing a machine learning work flow related to future profitability of a subscriber, respectively.

Figure 6:
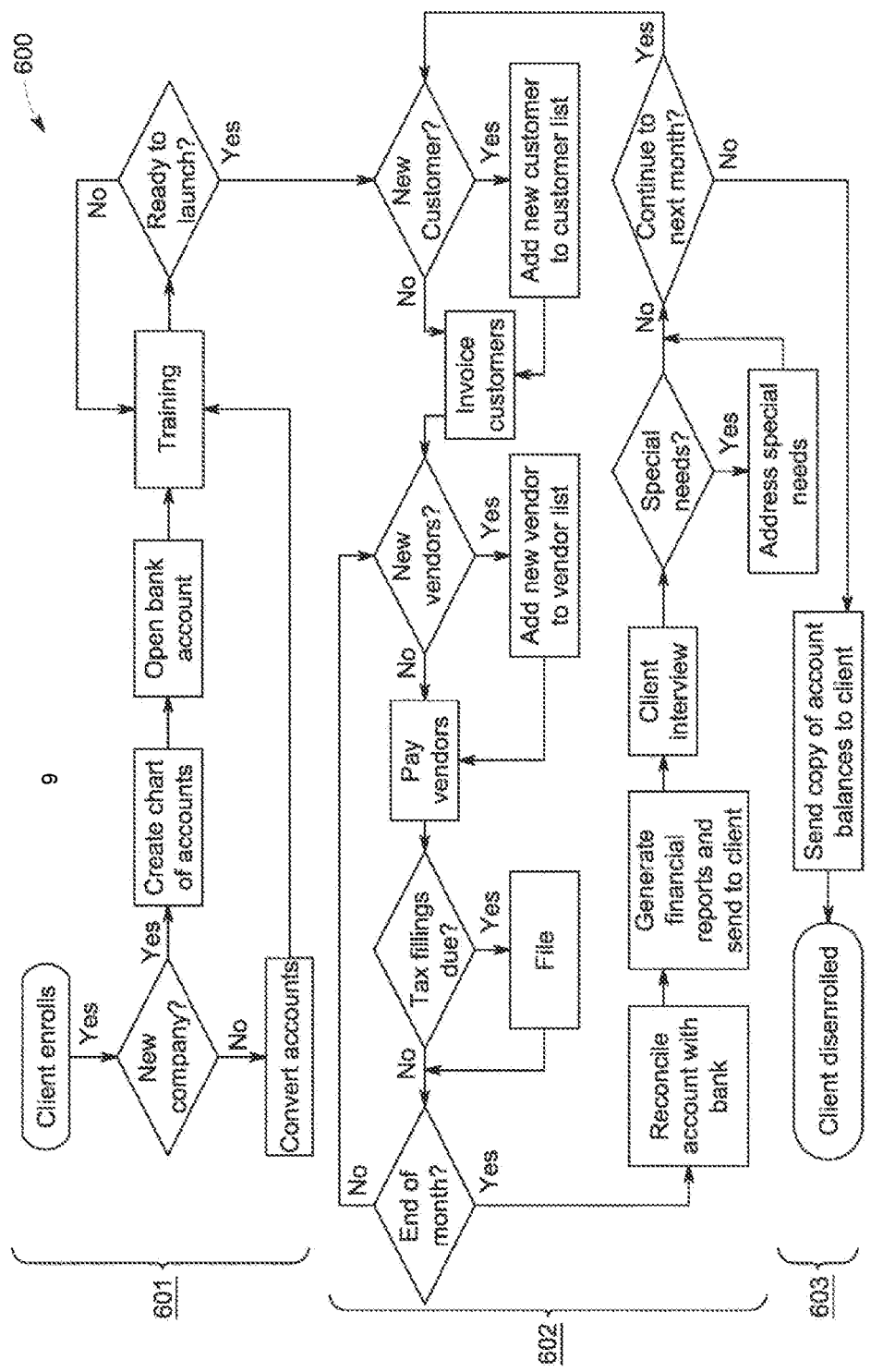

FIG. 6. Schematic drawing showing an exemplary method for providing audit-ready accounting services and "special needs" services.

Figure 7:
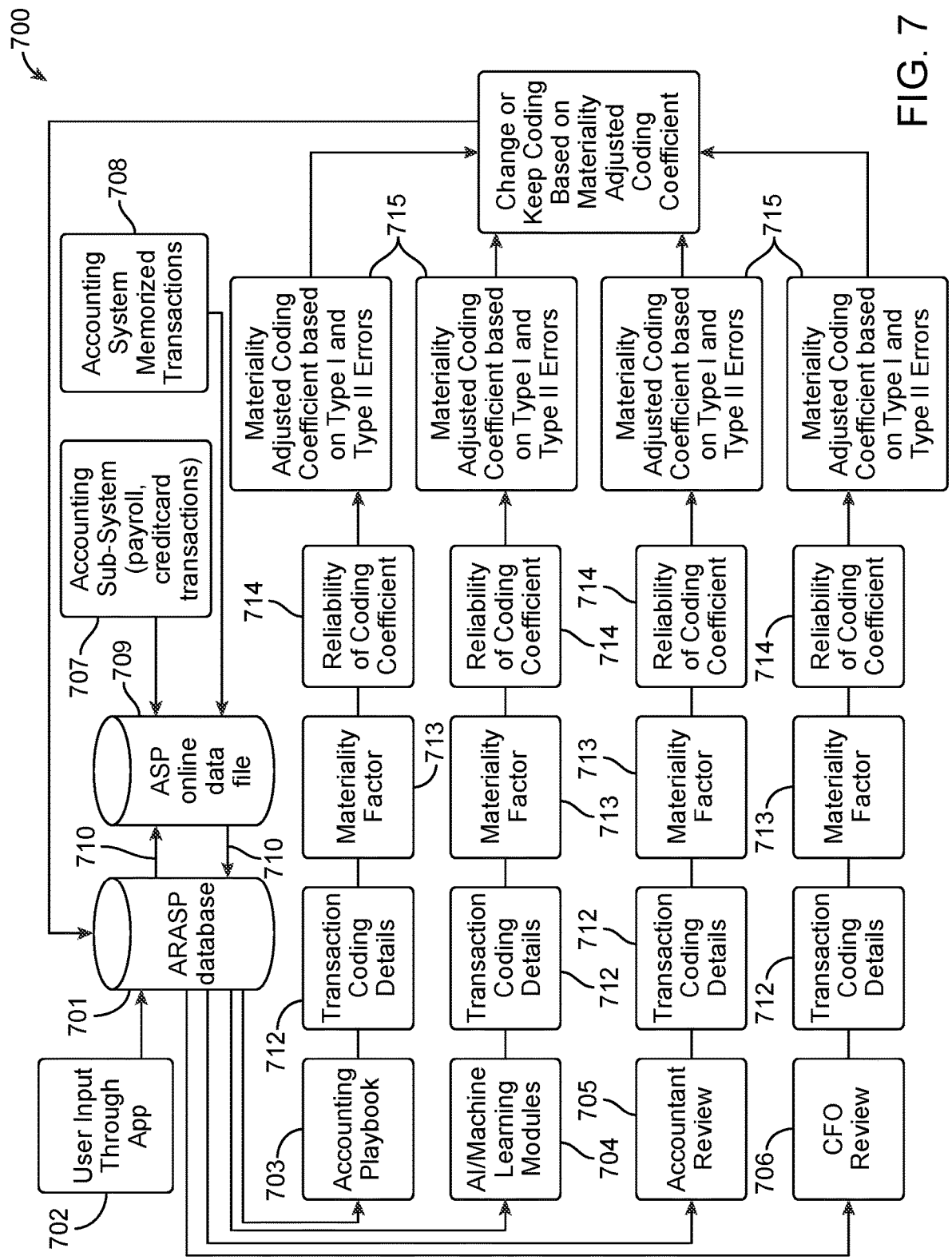

FIG. 7. Schematic flow diagram showing an exemplary method for providing audit-ready accounting services.

Figure 8:
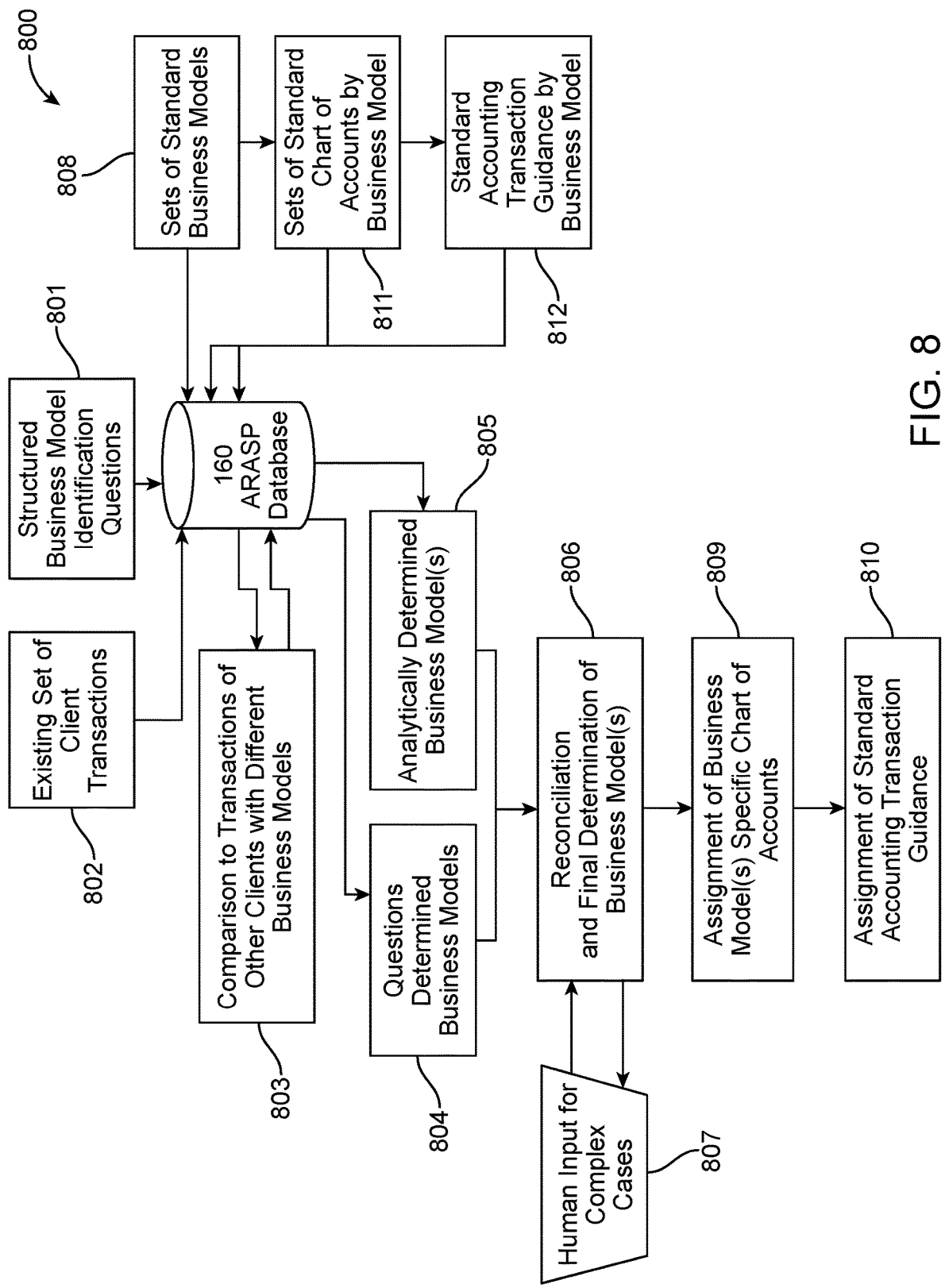

FIG. 8. Schematic flow diagram of an exemplary business model identification engine for an exemplary method for providing audit-ready accounting services All reference numerals, designators and callouts in the figures are hereby incorporated by this reference as if fully set forth herein. The failure to number an element in a figure is not intended to waive any rights. Unnumbered references may also be identified by alpha characters in the figures and appendices.

The following detailed description includes references to the accompanying drawings, which form a part of the detailed description. The drawings show, by way of illustration, specific embodiments in which the pilot assembly and methods may be practiced. These embodiments, which are to be understood as "examples" or "options," are described in enough detail to enable those skilled in the art to practice the present invention. The embodiments may be combined, other embodiments may be utilized or structural or logical changes may be made without departing from the scope of the invention. The following detailed description is, therefore, not to be taken in a limiting sense and the scope of the invention is defined by the appended claims and their legal equivalents.

In this document, the terms "a" or "an" are used to include one or more than one, and the term "or" is used to refer to a nonexclusive "or" unless otherwise indicated. In addition, it is to be understood that the phraseology or terminology employed herein, and not otherwise defined, is for the purpose of description only and not of limitation. For construing the scope of the term "about," the error bounds associated with the values (dimensions, operating conditions etc.) disclosed is ±10% of the values indicated in this disclosure. The word "substantially" used before a specific word includes the meanings "considerable in extent to that which is specified," and "largely but not wholly that which is specified."

DETAILED DISCLOSURE

Particular aspects of the invention are described below in considerable detail for the purpose for illustrating its principles and operation. However, various modifications may be made, and the scope of the invention is not limited to the exemplary aspects described.

A mobile application software or "app" is a computer program configured to run on a mobile device such as a smart phone, tablet or watch. An app comprises a front-end component or user interface ("UI") and is designed to provide the user with an easy-to-use and friendly interface. The front end communicates with a back-end component which facilitates data routing, security, authentication, authorization, working off-line, and service orchestration. An app may also communicate with one or more intermediate or middle components including, but not limited to, mobile app servers, message queuing, enterprise service bus ("ESB") and other service-oriented architecture ("SOA") infrastructure components. Data synchronization between the mobile device and a database or cloud and offline (without internet connection) capabilities are key to the seamless functioning of successful mobile apps. Providers of database and cloud services such as Couchbase Mobile (Couchbase), Azure Mobile Services (Microsoft), Cognito (Amazon), Firebase (Google) offer synchronization and offline capabilities with their mobile offerings. The app should preferably provide for secure data access communication with synchronized and decentralized storage, transmission and storage using features such as address authentication, data at rest, which relates to whether the app supports file system encryption and data-level encryption, data in motion, and read/write access that defines what data may be accessed and changed/modified by users. Databases may be relational (SQL databases such as Oracle, mySQL) or NoSQL (e.g., MongoDB, CouchDB). Further, for decentralized data writes on mobile platforms, the same data can be simultaneously modified on multiple devices and may create a conflict between data access from multiple devices. The app should preferably incorporate a mechanism for resolving those conflicts. The conflict resolution mechanism may allow resolution automatically, on the device, in the cloud, or could be manually initiated.

Disclosed is an app provided by an audit ready accounting service provider ("ARASP") that interfaces with an accounting software provided by an accounting service provider that include, but are not limited to, QuickBooks Online and Xero, via an application-programming interface ("API"). The API is a set of programming instructions and standards for accessing a Web-based software application or Web tool. For example, the QuickBooks Online API is a RESTful API that accesses QuickBooks Online using standard HTTP GET, PUT, POST, and DELETE methods and a simple JSON input and output format. The QuickBooks Online API performs a variety of accounting tasks including, but not limited to, manage customer and vendor databases, manage sales-side transactions (invoice, sales receipt, etc.) and purchase-side (bill, expense, etc.) transactions, retrieve QuickBooks Online reports, track sales and purchase taxes.

Figures 2A, 2B, 2C:

In an exemplary accounting method 100 provided by an ARASP (FIG. 1), the method comprises setting up a subscriber corporate profile account using an app in step 101. A corporate profile may comprise a corporate subscriber account and a predetermined number of user accounts associated with the subscriber account. Information required to set-up an account include company name and address identification (ID), number of authorized users associated with the subscriber, user ID, user login ID, user password and the like. A screenshot of the front-end (UI) of an exemplary accounting app is shown in FIG. 2A. Client profile information may be stored in database 160. The app is configured to receive user inputs, including but not limited to, entries related to bills and credit/debit card purchases, raise invoices, make bank deposits and the like. Oversight functionalities such as authorization by a line manager, and/or a corporate officer depending on the amount associated with the transactions and pursuant to a subscriber's authorization protocol may also be provided by the app. Further, a user may request assistance through the app from an accountant provided by the accounting service provider to manage transactional inputs.

FIG. 3A provides an exemplary list of data that may be required from a subscriber during onboarding (start-up) of a subscriber account. As can be seen, the subscriber entity may be a corporation, limited liability company, partnership and the like. For start-up companies, information related to founding members and a capitalization table may also be required from a subscriber. Authorize users associated with the subscriber may also be authorized to login to the app using their credential. Other information that may be needed, include, but is not limited to, tax related registration numbers, financial accounts information, payroll set-up information, names of shareholders, members, and partners if a subscriber is a corporation, limited liability company, or partnership respectively. Vendor and subcontractor information may also be input into the app during onboarding.

For each account profile, the app is configured to implement the steps of data capture and transfer, data processing, and generate processed data output. Transactional data may comprise expenses and payment data. Transactional data may be entered by at least one of the following steps, namely, (1) by an authorized user into the UI of the app and (2) may be e-mailed to a subscriber's e-mail account hosted by the ARASP or otherwise forwarded to the ARASP, for example, by mail. Sources for expense data may comprise at least one of invoices and itemized receipts generated by a variety of transactions related to corporate expenses of a subscriber account. Expense data may also be related to each authorized user of a subscriber and may include capital expenses made by the user and other non-capital expenses such as insurance charges related to medical, dental, disability, liability insurance and the like, legal and professional fees, office expenses, travel expenses, meals and entertainment and the like. Data may be provided in the following forms, that include, but is not limited to:

(a) invoices attached to e-mails related to corporate expenses (e.g., generated by vendors) and received into a subscriber corporate e-mail account (e.g., accounts-receivable@subscriber-finbox.com);

(b) receipts related to authorized user expenses and received into a user e-mail account associated with a subscriber account (e.g., user@subscriber-finbox.com);

(c) expense information input by an authorized user into a user account associated with a corporate account through the app provided by an ARASP to each subscriber. The app may be configured to accept and process a copy of a receipt captured by the user using a camera found in a smart device.

(d) transactional information generated by each user associated with a subscriber and transmitted by at least one of credit/debit card magstripe readers (e.g., Square readers) and point of sale contactless readers (e.g., near field communication payment technology, Bluetooth payment technology, and the like) in the form of an e-mail to a user e-mail account (e.g., user@subscriber-finbox.com) or directly to a subscribers credit card account or bank account (e.g., checking account);

(e) Credit/debit card statements associated with each user credit card associated with a subscriber, and (f) Bank statements associated with each subscriber account.

(A) Entering Transactional Data Through the App

When transactional data is input by the user using the app, the method may include the following steps:

(a) entering transactional data related to credit card purchase receipts, invoices/bills and the like. FIGS. 2B and 2C;

(b) at least one of capturing a picture of an invoice or receipt and attaching a picture of the document that may be stored in the data file folder of the user's smart phone in step 102; (c) submitting the entered transactional data through the app using the "Submit" button. FIGS. 2B and 2C.

(d) assigning an accounting code to the submission;

(e) storing transactional data in subscriber's folder in database 160; and, (e) synchronizing subscriber's folder in database 160 with subscriber's information in ASP's database 170 via the API that provides a bidirectional communication and data transfer link between databases 160 and 170. The app places a note "entered by client via app" in the transaction and is reflected in the transaction found in the subscriber's ASP account.

Since the transactional data was entered by an authorized user, authorization or approval from the user's line manager or pursuant to a subscriber's approval standard operating procedure may not be required.

The user may contact an accountant retained by the accounting service provider in step 104 to provide assistance related to bookkeeping issues, answer questions related to categorizing expenses (e.g., whether an expense is a capital expense or an operational expense) and assist with data entry to ensure that all inputs are audit ready.

(B) Transactional Documents that Arrive into User's Dedicated e-Mail Account

Figure 2D:
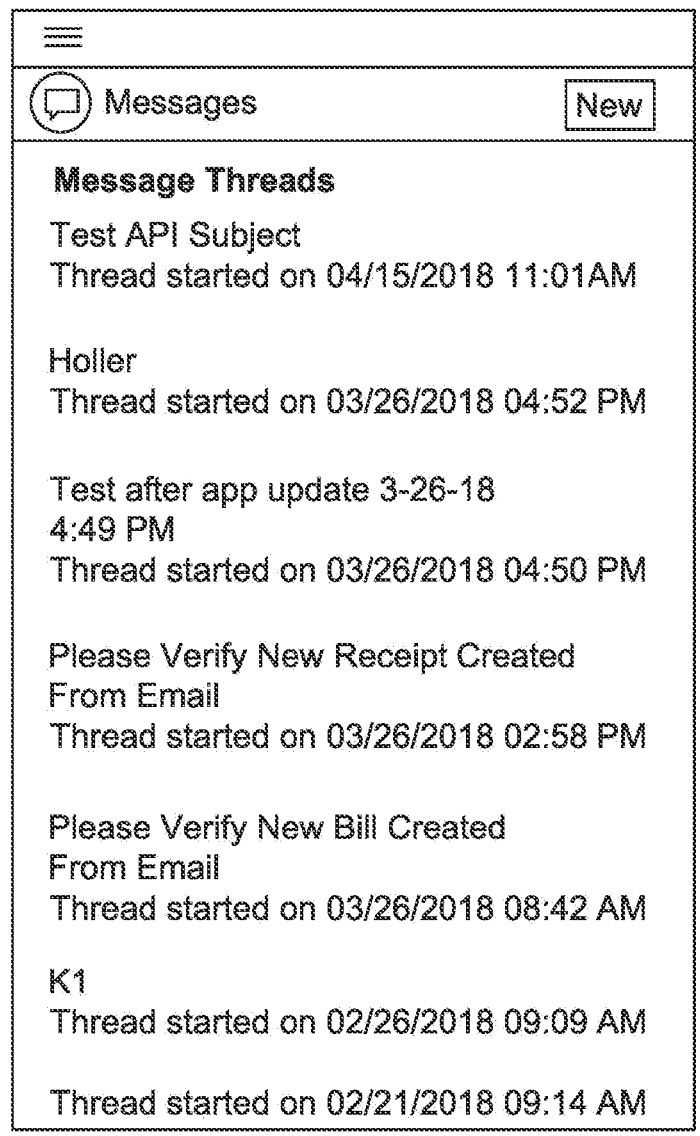

When transactional data is provided by vendors or service providers in the form of an e-mail, the method may include the following steps:

(a) setting-up an e-mail account for the subscriber hosted by the ARASP;

(b) Requesting vendors to forward e-mails of invoices and receipts to the subscriber's e-mail account in step 103. Alternately, a user may, instead of entering transactional data into the app, choose to e-mail a copy of invoices, receipts and the like to user's ARASP e-mail account;

(c) Entering transaction into subscriber's ASP account and attaching receipts to the transaction in step 109 by at least one of an accountant provided by the ARASP, a bookkeeper provided by ARASP, and the user;

(d) assigning an accounting code to the transaction;

(e) synchronizing subscriber's folder in database 160 with subscriber's information in ASP's database 170 via the API that provides a bidirectional communication and data transfer link between databases 160 and 170;

(f) sending a message comprising the transaction summary to the user via the app for approval in step 105 and using the messaging feature in the app, FIG. 2D; and (g) providing one of approval of the transaction via the messaging feature in the app (step 106), which is posted to the transaction in ASP database 170, and rejection of the transaction (step 107), in which case an amended transaction code is added to the transaction in step 108, which is then posted to the transaction in the subscriber's account in the ASP database 170.

Regarding entry of receipts (when payment already made with credit card or check) in step 109, the accountant or bookkeeper or user may enter transactional data into the ASP platform (e.g., QuickBooks) expense tab showing: account, vendor, amount, and then designates the source of payment (bank account or credit card). The person entering data may also attach a copy of e-mails and any supporting documents such as copies of receipts, bills, and subscriber invoices. The data entry person may then note in the memo field for the transaction "entered from email by x," where x is one of an accountant, bookkeeper, user.

For entry of invoices (payment not yet made with credit card or check) in step 109, the data entry person may enter transactional details into the ASP software bills tab showing: account, vendor, amount and then designates the source of payment, such as a subscriber's bank account. The data entry person may also attach a copy of e-mail and any supporting documents into the attachments field for the transaction. The data entry person may then note in the memo field for the transaction "entered from email by x," where x is one of an accountant, bookkeeper, and user.

Transactional documents forwarded by subscriber to ARASP, for example, by mail or courier may be processed using the same procedure outlined in step (B).

Subscriber information in database 160 may be used to generate subscriber specific chart of accounts in step 110 and may be used, for example, by an accountant associated with the ARASP to inform and guide account coding decisions and to review and suggest potential changes for account coding based on coding review for any account numbers entered by client in step 102.

FIG. 3B provides an exemplary list of tasks that are conducted for each subscriber account on a daily basis. FIG. 3C provides an exemplary list of tasks that are conducted for each subscriber account on a monthly basis.

In the above examples, a user associated with a subscriber account is able to monitor account status (liquidity, liabilities etc.) on a substantially real-time basis. Further, some or about most of the tasks described in the above examples may be automated.

Databases (or servers) 160 and 170 are synchronized at periodic intervals. A plurality of subscriber accounts, with each account unique to a subscriber of the ARASP may be stored in databases 160 and 170. The disclosed methods facilitate creation of audit ready accounting transactions, which may comprise accounting coding information, documentation and client approval. The exemplary method described above provides for accounting and bookkeeping characterized by fast and accurate data entry, a streamlined process for greater efficiency, tracking of transactions and cash-flow across multiple documents, and reduces risk of human error and resulting financial issues and ensures that information is audit ready Any communication between client and the accountant may be recorded in the Messaging feature of the app. FIG. 2D. All communications between the user and the accountant are stored in the Messaging feature of the app.

The data transferred from the app to database 160 may include tags, or additional bits of information, related to the time, date and location from where the data was sent, and the nature of the transaction (e.g., a marketing expense to be categorized as entertainment). The app may be able to analyze the transaction for security risks and fraud, provide alerts (e.g., text messages) and take necessary action. The app may post a transaction to the client's ledger in substantially real time or at predetermined intervals, and add the transaction to the approved payables list, or place the transaction on a list of transactions in queue for secondary verification.

Security features may be built into the app. For example, techniques, protocols, and tools that enable the data to be encrypted, to enable the system to verify that the device used to transmit the data is actually owned by the user, to ping a user's device (e.g., text message, push authentication and the like) to check if the user's device is ready to receive data or reports sent from the server to the user's device may be used. Alphanumeric password protection may also be used. Alternately, the app on the user's device may be capable of verifying and allowing any communication from database 160.

The first and second applications may communicate via Transport Layer Security ("TLS") protocols for secure exchange of data over a network and to preserve data integrity. TLS (e.g., TLS 1.2) ensures that a connection to a targeted endpoint is the intended endpoint through encryption and endpoint identity verification.

Subscriber data provided by accounting module 100 and stored in ARASP database 160 may be utilized by the subscriber for value added data analysis and planning in addition to audit ready accounting. In an exemplary method 400, information from other databases 180 may be aggregated into a master database 190 (FIG. 4). An example of database 180 is a subscriber's sales management database, for example, subscriber's CRM ("customer relationship management") tools that include, but are not limited to, Salesforce, Pipedrive, Freshsales, Insightly, and Zoho databases. A sales database allows a customer to maintain in substantially real-time customer lists, monitor its sales pipeline, current sales and sales targets, contacts, customer communications, prioritize and focus sales and business development activities, and develop and implement subscriber's sales strategy taking into account subscriber's cash flow forecasts. Another example of database 180 is a subscriber's patent portfolio management database, which may be provided as a docket by subscriber's external patent counsel, to manage and grow subscriber's patent strategy, and to align patent filing, prosecution and maintenance costs with patent monetization strategies via product sales, enforcement, licensing, acquisitions and the like. Outputs of tools such as Thomson Innovation, Anaqua, PatSnap that provide competitive analysis of a subscriber's patent portfolio may also be aggregated to examine subscriber's SWOT (strength, weakness, opportunities, and threats) within subscriber's competive space, and to identify "white space" for subscriber's R&D team to exploit, and development of next generation innovative concepts, products, and offerings.

Data exchange and communication between the plurality of databases 180 and master database 190 is managed through the app via for example, an API associated with databases 180. For example, the app may communicate with a Salesforce database via REST and SOAP based APIs. The app may also be configured to pull commercial data, analytics and other corporate information from subscriber's account at service providers such as Dun & Bradstreet, Inc.

Information stored in database 190 may be used by the app to generate indicators related to subscriber's current profitability and predict future profitability. The app is configured to perform data mining of data stored in database 190. Data mining may be generally defined as "the practice of examining large databases in order to generate new information." Data mining may be used by subscribers to look for patterns in large batches of data that may be used to improve their corporate internal management processes, develop more effective marketing strategies, implement product development roadmaps that align with marketing strategies, and achieve sustained revenue growth as well as increased sales and cost reduction. The app may utilize a plurality of knowledge-based editors or learning algorithms (191 and 192) to predict and optimize outputs (193 and 194) such as product development roadmaps, innovation roadmaps, cost control options, revenue forecasts, sales forecasts, sales strategy, pricing strategy, project execution, general accounting compliance, general accounting fraud assessment, tax strategies, fiduciary obligation of stakeholders and officers and other best practices to examine current profitability and predict future profitability of a subscriber. Machine learning algorithms for predictive analysis include, but are not limited to, linear regression, logistic regression (go-to methods), linear discriminant analysis, classification and regression trees (decision trees), Naïve Bayes, Random Forest, Gradient Boosting, XG Boost, LG Boost, CatBoost, SVM, ANN, genetic algorithms such as eLCS, XCS, ExSTraCS, K-Nearest Neighbors, and Learning Vector Quantization. The app may utilize rules-based algorithms that examine a plurality of subscriber transactions and data in database 190 at predetermined intervals using environmental sensors (or indicators) that include, but are not limited, to (a) financial indicators (e.g., market volatility, debt ratios, profitability, financial leverage, and the like); (b) market indicators (e.g., total available market, market penetration potential, customer pain points, repeat business percentage, ability to add new customers, and the like); (c) technology readiness in a product development roadmap, SWOT analysis, and the like; (d) customer response to questionnaires, customer behavior studies, market disruptions, change in customer preferences, and the like. Learning algorithms may utilize fully and partially observable data, deterministic and stochastic data, discrete and continuous data, benign and adversarial environmental data, and the like to output recommendations (e.g., future profitability) that is statistically reliable.

Data inputs (input variables) to these learning algorithms may comprise data mined from database 190. As shown in FIG. 5A, exemplary environmental and internal indicators 501 may be processed by the app to extract a set of exemplary indicators 502, which may be further processed to identify exemplary decision points 503 that may comprise a subscriber's market attractiveness and competitive position, which may be then used to estimated performance indicators such as current profitability of a subscriber (output variables). Since change is inevitable, the app may be used to help a subscriber predict changes and adapt to changes, and to maintain its continued future profitability. As shown in FIG. 5B, current profitability and other performance indicators 504 may be used to forecast indicators 505, which may then be manipulated to yield summary indicators 506 that may be used to forecast subscriber's future profitability. Learning routines may also be applied using accounting data stored in database 160 to predict accounting codes in step 111 that may be fed into step 109.

Although methods 100 and 400 describe storing input and output data in a plurality of databases, the functionalities of the databases may be combined into a single master database such as database 190. Further, the app may be modified to process the accounting functions of the software provided by the ASP (e.g., QuickBooks), thereby eliminating the need to link with an ASP software via an API.

The features and capabilities of databases 160 and 170 may be integrated into a single database (or server). In this aspect, the ARASP software may incorporate the features and capabilities of the ASP software that are required for basic accounting services, in particular, for start-up companies and SMEs. Exemplary systems and methods described may provide for sequencing a plurality of bookkeeping events 600 (FIG. 6) at periodic intervals, (e.g., once a month). Step 601 provides for enrolling a new user and/or subscriber. A subscriber may be able to select from a suite of services in addition to basic accounting services. For example, a subscriber may add-on one or more of services ("special needs"), which include, but are not limited to:

(a) M&A and investment services that provides for keeping track of the user's capitalization table, convertible loans and other investment related functions;
(b) Intellectual property assets and expense management and categorization;
(c) Stock option plans;
(d) Asset purchases and depreciation schedule;
(e) Employee hiring and termination, and
(f) Communication with the user's bank account.

A subscriber may also be able to upload (or migrate) its existing chart of accounts after creating a new account. Step 602 allows a subscriber to add customers, vendors, select the modes by which the subscriber wishes to make or receive payments (e.g., cash, check, wire transfer, ACH etc.). Prequalified vendors and customers may be able to receive or make payments directly from/to the subscriber's account if they are provided access to do so by the subscriber. The system may provide periodic reminders to the subscribers related to tax payments and the like. At periodic intervals, the subscriber's financial information stored in the subscriber's account may be reconciled with the subscriber's bank account.

Subscriber accounts may be renewable at predetermined intervals. The intervals may include once a month once a year, once in two years and the like. Security features may be built into the accounting software. For example, techniques, protocols, and tools that enable subscriber data to be encrypted, to enable the system to verify that the hardware and interface used to transmit the data is actually owned by the subscriber, to ping a user's device (e.g., text message) to check if the user's device is ready to receive data or reports sent from the server to the user's device. Alternately, the "app" on the user's device may be capable of verifying and allowing any communication from the server. The data transferred from an authorized device to the server may include tags, or additional bits of information, related to the time, date and location from where the data was sent from, and the nature of the transaction (e.g., a marketing expense to be categorized as entertainment). The accounting software may be able to analyze the transaction for security risks and fraud, provide alerts (e.g., text messages) and take necessary action. The accounting software may post a transaction to the client's ledger in real time or at predetermined intervals, and add the transaction to the approved payables list, or place the transaction on a list of transactions subject to a secondary verification. Methods of performing a secondary verification include sending an SMS message or a message through the app to a user (or to another member of a subscriber's team) and requesting the user to take some specific action that will provide secondary validation.

Before an invoice is paid either electronically or by check, the server may communicate with the user's bank account and verify that there are sufficient funds in the user's account to enable the transaction. If there are insufficient funds, the server may first notify the subscriber. A human bookkeeper provided by the ASP may assist the user (or the accounting software) with executing or verifying transactions. For example, if there are insufficient funds in a subscriber account to pay a bill, or the subscriber has sufficient funds but has requested a payment that exceeds predetermined limits, a human bookkeeper may contact the user to discuss the transaction.

At regular intervals, an approved payable list may be sent to a user's bank for electronic payment of each A/P pending. Payments that are not able to be completed electronically may be routed to a paper check operation center. Paper checks may be prepared and mailed manually, or an automated check printing machine may be utilized, or a hybrid process may be utilized whereby some of the steps are automated. If a subscriber wishes to terminate its account (step 603) the exemplary system may provide a copy of requested documentation or summary reports to the subscriber and terminates the account. The information related to a user account may be archived for a pre-determined time, or as required by law.

Synchronizing (reconciling) the subscriber's account with its relevant business bank accounts may not always work because expenses and or payments may be misallocated and not treated appropriately for tax purposes. In an exemplary aspect, data input, processing and reporting may be automated. An automated accounting system may receive user input (receipts, invoices, payments etc.), match payment received with invoices, process received input into appropriate categories with minimal or no user intervention, manage accounts, and output reports such as P&L statement, balance sheet, A/P summary, and A/R summary as needed. Further, a subscriber's "special needs" as described above may be integrated with accounting services. While using the app as the user interface may be preferred, the interface between may be a website or web portal provided by an ARASP and accessible using a user device.

In another exemplary method 700 (FIG. 7) for efficient delivery of accounting and corporate planning services, the ARASP software may comprise modules comprising a user app 702, accounting playbook 703, AI/ML (artificial intelligence/machine learning) module 704, accountant module 705 and CFO or client supervisor module 706 that are configured to be in bidirectional communication with ARASP database 701. For every subscriber specific transactional entry (minimum of two entries per transaction to cover debit and credit), the exemplary method may be implemented using the ARASP software and is configured to record data including the account number, account code, transactional number, amount and the module in which where the account number was assigned from which the account number originated. The range of variability in account number assignments by each module may be bound by the most inconsistent case where every module in the ARASP software assigns a different account number to a transaction. In the most consistent case, every module assigns the same account number to a transaction. Data for each transactional entry by a module may be collected as follows: (1) account class (asset, liability, owner's equity, revenue expense); (2) account number; (3) amount; (4) account class correct/incorrect validation based on a preliminary examination and flags differences from memorized transactions to the ARASP database, (5) account number correct/incorrect validation, and (6) amount correct/incorrect validation. Type I error (false positives) and Type II error (false negatives) for each module including the accounting playbook module 703 and AI/machine learning module 704 may be then estimated periodically and cumulatively over a series of transactions for each major iteration of the modules. Furthermore, Type I and Type II errors may be calculated periodically and cumulatively over a series of transactions for each individual user (or client or subscriber) of ARASP software, and each individual accountant (module 705), and each individual user or client CFO or oversight supervisor (module 706). Significant number of errors (likely will be customized for each client based on average transaction entries per month) measured by the absolute frequency rate for each module and by materiality (defined below) for each transactional entry may be used to improve the statistical accuracy of accounting playbook 703 and AI/ML module 704. Similarly, significant number errors measured by absolute frequency rate by module and by materiality of entries involved may be used to modify training and quality control monitoring of users, accountants, for example, provided by an ARASP, and CFOs of a user or client company.

Inputs into ARASP database 701 may include, but are not limited to, user (or subscriber or client) inputs from module 702 inputted into or through the app provided by the audit ready accounting service provider ("ARASP"), inputs from an accounting playbook 703, inputs from machine learning modules 704, inputs from an accountant retained by the ARASP 705 and inputs from an ARASP client officer 706 who has oversight responsibilities such as the CFO of the client. Depending on the amount associated with each transaction, a line manager may be authorized to perform oversight responsibilities instead of a corporate officer such as a CFO. As previously described, user (or ARASP subscriber) inputs from module 702 may include, but are not limited to, digitized source documents such as expense receipts related to user transactions, entries made by the user through the UI of the app related to bills and credit/debit card purchases, e-mails related to user transactions received into a user account and into the ARASP database, invoices raised by the user, bank deposits made by the user and the like. Further, a user may request assistance through the app from an accountant provided by the ARASP to manage transactional inputs.

Accounting playbook 703 is an accounting coding module that is configured to identify and evaluate transactions for which there are at least one of a number of attributes including, but not limited to, (a) a wide range of acceptable accounting methodologies which may be selected based on the financial and tax planning goals of a company, (2) transactions which have highly specialized and specific financial and/or taxation rules and documentation requirements such as travel, entertainment and meals expenses, and (3) transactions for which even small dollar errors or incorrect categorizations may expose the company (client) to large financial and/or legal risks like improperly categorizing an inflow of funds into a company as debt when it should have been categorized as equity or vice-versa. Coding of transactions is a process that reviews an underlying transaction and assigns relevant codes to each transaction corresponding to key attributes of the transaction so that it can be recorded in an accounting system to meet audit ready requirements. Information for which codes are assigned include, but are not limited to, (a) accounting categories such as asset, liability, equity, income, expense, (b) account number corresponding to a user account name, (c) dollar amount of each transaction, (d) date of the transaction, (e) relevant description for a transaction, (f) relevant units for each type of transaction, that is, units purchased, units sold, labor hours, and the like, and (g) electronic link to or embedding of relevant source document to a transaction. Any other data or meta data identified with a transaction which may be used in machine learning or other algorithms such as location, GPS coordinates, time stamp, internet protocol (IP) address of an originating transaction for assigning accounting codes. Other transactional inputs from module 707 related to a user account such as user payroll information from the user or from its payroll service provider, user bank transactions provided by the user's bank or banks, user credit card/debit card transactions provided by the user's credit or debit provider and from accounting system memorized transactions module 708, may be input into a ASP 709 and synchronized with the user account information in the ARASP database 701 via the API that provides a bidirectional communication and data transfer link between databases 701 and 709 in step 710. Most computerized accounting systems track recurring vendors, clients, transactions and their historical accounting and are configured to readily identify these entities and transactions. These are validated by the user of the ASP for acceptance.

Databases 701 and 709 may be synchronized at periodic intervals, which may be on a daily basis, so that the transactions match between the ASP (e.g., QuickBooks or other accounting software provider) and the ARASP database. Alternately, any ARASP module previously described that requires that databases 701 and 709 should be synchronized for a certain client or user account, may trigger an immediate synchronization for that client or user account. An example of a module that may require an immediate client-specific synchronization is the operation of client-specific accounting code machine learning routines that have the ability to change accounting coding for a transaction or transactions for a specific client. During synchronization ARASP clients (users) having existing historical accounting transactions, chart of accounts, and other essential data in the ASP software and database 709, the data of each client transaction in the ASP database is mapped into the appropriate matching data category or location in the ARASP database so that transactional data will be usable for the wide range of ARASP enable functions including verification of coding using the various elements of the ARASP coding engine and accounting playbook 703. Synchronization in step 710 therefore ensures that all valid transactions that are added, deleted or changed in the ARASP software is mirrored in the ASP (e.g., QuickBooks) software, and all valid transactions added deleted or changed in the ASP software is mirrored in the ARASP software so that once synchronization is completed, the essential transaction details for a client in both ARASP database 701 and ASP database 709 are substantially the same. All transactions, whether they originate from the ARASP (or ARASP user interface) or from the ASP software are validated and analyzed using the ARASP software and its modules such as the accounting playbook 703 and machine learning modules 704.

Besides assigning a source coding for each transaction in each module, (for example, whether each transaction was inputted into the ARASP database or ASP database, and from outside processors such as payroll, blockchain processors where detailed records may not be available in the ASP database) transaction coding details for each transaction in step 712 (for example, the amount related to each transaction), each module may also assign a materiality factor to each transaction in step 713. Materiality generally refers to the relative size of a transaction amount and balances other factors such as the type of the user in terms of market cap or revenue generation potential. Determining materiality requires professional judgement. For instance, a $20,000 transactional amount would likely be immaterial to a large corporation with a net income in the millions of dollars but would be material for a small organization (user) with a net income of $40,000. Alternately, materiality enquires whether sophisticated investors would be misled if the transactional amount was omitted or misclassified. If sophisticated investors would be misled or would have likely made a different financial decision because of their reliance on a particular transaction, the transactional amount is considered to be material. If sophisticated investors would not be misled or would not have made a different decision, the amount is judged to be immaterial. Materiality is therefore not strictly proportional across all transactions and all accounts. The materiality factor is a client specific, transaction-specific amount that is used to determine whether coding for any given transaction requires additional analysis. For example, transactions that impact the timing and amount of revenue recorded would generally be assigned a higher materiality factor measurement. Similarly, transactions involving the categorization of expenses between one expense account and another expense account would generally be assigned a lower materiality factor. The materiality factor for any given transaction may be based on the business model of the user, size of the user in terms of revenues and assets, type of transaction, and likelihood that any given transaction coding is incorrect based on statistical models and historical transaction data for a particular client, for all clients with similar business models, and for all ARASP clients. Other factors impacting the materiality factor for a given transaction are whether incorrectly recording the transaction would subject the client to relatively higher level of financial or legal risk. For example, users that pay no income tax due to large net losses may have a higher materiality factor for revenue transactions than profitable companies that pay additional income taxes for each additional dollar of revenue recognized for a period. Each module evaluates transactions that are not easily evaluated using statistical techniques such as clustering. In each module, transactions rely on defined rules for evaluating data and meta data about a transaction. These rules are then refined and improved over time using structured review by human experts and updates to the ARASP algorithm. For example, legal fees may be subject to a wide range of accounting treatments depending on the stage of a company and the specific legal services provided. Accounting playbook 703 may first identify a charge as being a likely legal fee by using transaction description data and meta data to help identify legal charges through inclusion of meta data for all law firms and attorneys in a county. The coding for a specific legal charge would be based on mapping of the descriptions in a legal bill to probable accounting treatment. Finally, such transactions would have a high materiality factor and would frequently trigger reviews by accountants and the CFO. In step 714, the reliability of coding assigned in steps 712, 713 and 708 are initially examined using statistical analysis (e.g., factor analysis, confidence intervals, student t score, etc.) in each module.

In AI/ML module 704, machine learning or statistical learning is used to provide either inference or prediction or a combination of the two. Prediction attempts to determine the input variables that have an impact on output variables.

The inputs (X) may comprise predictors, independent variables, features, and the output variable is often called the response or dependent variable and is usually represented by Y. Output Y and inputs X may be related to each other using function, $f$. In essence statistical and most machine learning refers to a set of approaches for estimating $f$. In prediction problems a set of inputs X are readily available, but the output Y may not be easily obtained. Thus, the error rate related to this correlation between X and Y usually requires statistical techniques. Observations, historical information or metadata may be for establishing a training data set to train or teach methods for estimating $f$. A number of methods including, but not limited to, parametric and non-parametric methods, decision trees, support vector machines, clustering methods may be used. Accounting AI/ML module 704 learns transactional coding behaviors and suggest where transactions should be allocated. For instance, if a salesclerk usually allocates a product to a particular sales account, and if the salesclerk adds that product to an invoice, the ARASP will automatically allocate it to the correct account. Every transaction may be analyzed via the accounting playbook 703, industry or company accounting policies, historical transaction data and statistical measures of variability and occurrence. For example, sales invoices typically show information that may comprise transaction date, order quantity, reorder history, amount, sale terms, and shipping data that can be analyzed for trends and statistical anomalies. ML techniques may be used to also review errors that bookkeepers and accountants fix and can assign a weight to the decision accuracy of those correcting entries. A CFO's decision, for example, may carry a higher probability of accuracy than an accounting clerk for entries or adjustments. Bank account reconciliations with ARASP software may also be automated. ML may be used to learn from previous allocations and account choices and make the correct recommendation for new bank transactions.

When training, managing, and controlling systems utilizing AI/ML in module 704 for coding of accounting transactions, there are many potential points of failure that could result in accounting errors. These errors include, but are not limited to, (1) recording the right amount to the wrong accounting code, (2) recording the wrong amount to the wrong accounting code, (3) recording the wrong amount to the right accounting code, and (4) recording the transaction in the wrong period. When human experts (e.g., CFO) review transactions coded by an AI/ML module 704, a judgement may be made regarding whether the transactions are properly or improperly coded. There are two major issues involving the intervention of human judgement in an AI/ML based accounting system. The first is that when an AI/ML based system improperly codes transactions systematically, a structured protocol to address needed updates to the system logic and programming is needed. The second is that human experts may make mistakes as well including, but not limited to, (1) confirming that transactions are properly coded when in fact they are not, or override the coding of a transaction by the AI/ML based system, when in fact the transaction was correctly coded. These issues involving the intervention of human judgement in an AI/ML based accounting system are both addressed by a system of recording and analyzing the record of success/failure for transaction coding by each of the major modules in the system. This record of success/failure for each system module may then be measured using Type I (false positive) and Type II (false negative) error statistics. In module 704, multiple training datasets may be used to provide granularity for specific industries. For example, historical financial data may include broad 2-3 digit SIC/NAICS codes and 3-5 digit SIC/NAICS codes. Training datasets will be periodically reviewed, for example, annually. Where historical observations are not readily available for example, observations or data used for fraud or risk management may rely on hypothetical or synthetic data sets generated to test nuanced or low probability events that have high impact.

Transactions with coding data or metadata that indicate a high prevalence of errors would be subjected to additional verification in step 714 in the exemplary ARASP software accounting playbook. In step 715, the ARASP software may assign materially adjusted coding coefficient (MACC) based on both materiality and historical reliability analysis (related to accounting classifications and descriptions) performed in step 714 for each module. This coefficient may then be fed into the training data set used in the AI/ML module (step) 704 or routed back to the ARASP database for refining the coding allocation technique. Accounting playbook 703 in combination with the AI/ML module 704 disclosed herein assist auditors and management (of the client) with assessing materiality, qualitative areas of interest, transaction accuracy and identified omissions by calculating a statistical "batting score" or "Materiality Adjusted Coding Coefficient" in step 715 that can highlight possible areas of focus. Additionally, the Coefficient may be used as a tool to assist management and external auditors in fairly reviewing the company's financial condition and prospects. Therefore, in exemplary method 700, coding corrections are made using set of processes using the different methods of assigning accounting codes, AI/ML, accounting playbook, client, accountant and accounting manager. A materiality and reliability score for all available methods that have registered an accounting code are compared. For lower materiality, and sufficiently high reliability score, method 700 is calibrated to automatically correct the assignment of accounting code from a lower reliability score. For high materiality, the same process applies, but an accountant or accountant and CEO may review and accept/reject or modify the machine/algorithm assigned accounting. This disclosure also provides additional details related to steps 193 and 194 in method 400. In method 700, client specific transactions with at least one of low materiality and high assigned coding keep rates based on MACC may be processed by accounting playbook 703 and used to improve the training data set and performance of AI/ML module 704. Transactions with at least one of high materiality and low assigned coding keep rates are flagged for further review using the accountant module 705. Transactions with at least one of significant materiality and very low assigned coding keep rates may be flagged for CFO review in module 706. The ARASP software may be configured to define a cascading methodology between the modules for reviewing transactions for each client.

The ARASP app that implements exemplary method 700 may be configured to run on a smart device or on a personal computer or computer server through a downloadable app, or on a personal computer or computer service using a web browser. A smart device (e.g., smart phone, tablet, watch) may be defined as a context-aware electronic device capable of performing autonomous computing and connecting to other devices wire or wirelessly for data exchange. Any device that can access the Internet is a web-portal/laptop/computer including smart phone, smart watches, televisions with enabled web browsers and any other device that can connect to the Internet. The ARASP and ASP accounting software may be configured as standalone desktop or sever versions of accounting software and may be either single user or multiple user version. Further, the ARASP database 701 and ASP database 709 may be flat files, relational databases, structured databases or any other machine-readable database.

The exemplary methods and systems previously disclosed may further comprise a business model identification engine 800 (FIG. 8) comprising structured software to facilitate and automate the process of identifying one or more subscriber specific business models preferably during onboarding a subscriber. Engine 800 is disposed in data communication with ARASP database 160. Based on the selected business model for the subscriber, a customized chart of accounts, accounting playbook, and standard accounting guidance for transactions that are likely associated with the selected business models are assigned to the subscriber by ARASP database 160. Engine 800 may be configured to present a structured set of questions 801 to the subscriber to identify and assign one or more subscriber specific business models in step 804 based on the responses provided by the subscriber. An exemplary structured set of questions 801 may comprise at least one of:

Do you manufacture or assemble products?

Are your products manufactured or assembled in lines, batches or individually?

Are sales of services primarily related to products that you previously sold?

For services, what types of costs are charged directly to a client job (labor, materials, outside services, overhead, other)?

For services performed, do you invoice (charge) based on time and materials and overhead plus a profit margin, or charge a fixed fee, or charge using both methods or charge based on other methods? If using other methods, please describe.

Do you develop software? Is this software marketed by your company? Is the software you produced licensed or sold to only one party? Licensed or sold to multiple parties?

For subscribers who are able to provide a sample set of transactional data 802 during the onboarding process, ARASP database 160 may also be configured to conduct a transactional analysis using the onboarded client data 802 to assign one or more subscriber specific business models. The transactional analysis may comprise comparing the subscriber data set 802 with at least one of transactional data from other subscribers and with one or more predetermined sets of reference transactional data to which one or more business models have been previously assigned. Database 180 may look for similarities in transactional data patterns and assign one or more business models by assuming that similar transactional data is associated with similar business models.

Statistical correlations and machine learning methods may be used to compare subscriber sample transactional data 802 and subscriber metadata (FIG. 3A) with that of existing subscribers having assigned business models or with a predetermined reference transactional data and metadata set having associated business models in step 803. The predetermined reference transactional data and metadata may comprise transactional data and metadata of selected subscribers or all of existing subscribers of the audit ready accounting service provider. If a correlation is found between a new subscriber sample transactional data and metadata (802 and FIG. 3A) and a predetermined reference set of transactional data and metadata, the one or more business models associated with the reference set of transactional data and metadata may be assigned to the new subscriber in step 805.

When the business models identified in steps 804 and 805 are similar, no human intervention is needed, and the one or more business models are assigned to the subscriber in step 806. However, if the business models identified in steps 804 and 805 are significantly different from each output, review by an expert associated with the audit ready accounting service provider may be needed in step 807 to reconcile the different business models and assign one or more business models to the subscriber in step 806. Expert review may also be triggered by other reasons, for example, by poor correlation between subscriber provided transactional data and reference data and by questionable or partial responses provided by the subscriber in response to structured questions 801. In the event the standard set of business models 808 is deemed to be not satisfactory for the data and facts presented by the subscriber, the expert may develop a new customized chart of accounts and standard accounting transaction guidance for the subscriber.

Exemplary standard business models 808 may include, but are not limited to fee for time (service), flat fee (service), value-added reseller, retail online, retail fixed location(s), manufacturer, software developer, contract research and development, mining and resource exploration, aggressive growth commodity type products/services to numerous markets, aggressive growth via price competitive new products/service to large customers, aggressive growth with narrow special products/services, controlled growth with broad product/services range to many markets, controlled growth via premium priced products/services, limited growth in small niches offering superior product/service, average growth via steady development of new channels, brand identification and heavy promotion and limited growth selling infrequently purchased products/services to numerous markets. These exemplary business models may be used to process transactions related to small and mid-sized for-profit enterprises but may also be configured to include large enterprises. Once suitable business models are identified for a subscriber in step 806, the subscriber is assigned a customized chart of accounts that is suitable for the assigned business model or models in step 809. Relevant accounting guidance are also assigned in in step 810 (Examples 1 and 2). The customized chart of accounts is selected from a standard chart of accounts 811 made available by the audit ready accounting service provider in database 160. Standard accounting transaction guidance 812 comprises a set of accounting entries customized for a specific business model.

Exemplary engine 800 may also comprise a verification module (not shown in FIG. 8) that periodically evaluates the transactions of a subscriber to assess whether the one or more business model assigned to the subscriber during on boarding (and associated chart of accounts) are still relevant for the subscriber or if a new business model (and associated chart of accounts and standard accounting guidance) is needed. If a new model is needed, for the subscriber relatively quickly after the onboarding process, a new chart of accounts and accounting guidance may be added. Multiple business models with separate chart of accounts may be used simultaneously for a subscriber. If a new business model is identified after significant transactions have occurred for a particular subscriber, the model may need to be remapped to a new chart of accounts and accounting guidance.

EXAMPLES

Example 1. Exemplary Key Retail Accounts and Accounting Guidance for Inventory and Sales Business Model

| Accounts | Details | Accounting guidance. Debit (DR) or Credit (CR) |
|---|---|---|
| Inventory purchase | Inventory with item specific identification | DR |
| | Accounts payable by vendor | CR |
| For sale of specific item | Accounts receivable or cash | DR |
| | Sales of specific item | CR |
| | Sales Tax or Gross Receipts Tax Payable (if applicable) | CR |
| | Cost of Goods Sold | DR |
| | Inventory with specific item identification | CR |

Example 2. Exemplary Manufacturing Accounts and Accounting Guidance for a Subscriber Using Job Costing Manufacturing Accounting

| Accounts | Details | Accounting guidance. Debit (DR) or Credit (CR) |
|---|---|---|
| For purchase of inventory not specific to a job: | Company Inventory with item specific identification | DR |
| | Accounts payable by vendor | CR |
| For purchase of parts or material specific to a job: | Job specific costs (inventory) | DR |
| | Accounts payable by vendor | CR |
| For use of inventory for a specific job: | Job specific costs (inventory) | DR |
| | Company Inventory with item specific identification | CR |
| For general overhead costs assignable to many jobs over time: | Overhead - labor | DR |
| | Overhead - materials | DR |
| | Overhead - energy | DR |
| | Overhead - occupancy | DR |
| | Overhead - other | DR |
| | Accounts Payable by vendor | CR |
| | Job specific cost (inventory) | DR |
| | Overhead clearing | CR |
| For completion and sale of job-specific item | Accounts receivable | DR |
| | Sale-job specific | CR |
| | Sales Tax or Gross Receipts Tax Payable (if applicable) | CR |
| | Cost of Goods Sold - job specific | DR |
| | Job specific costs (inventory) | CR |

The Abstract is provided to comply with 37 C.F.R. § 1.72(b), to allow the reader to determine quickly from a cursory inspection the nature and gist of the technical disclosure. It should not be used to interpret or limit the scope or meaning of the claims.

Although the present disclosure has been described in connection with the preferred form of practicing it, those of ordinary skill in the art will understand that many modifications can be made thereto without departing from the spirit of the present disclosure. Accordingly, it is not intended that the scope of the disclosure in any way be limited by the above description.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this disclosure is entitled. It should be understood that all actions may be expressed as a means for taking that action or as an element which causes that action. Similarly, each physical element disclosed should be understood to encompass a disclosure of the action which that physical element facilitates.

In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Further, the use of the transitional phrase "comprising" is used to maintain the "open-end" claims herein, according to traditional claim interpretation. Thus, unless the context requires otherwise, it should be understood that variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible.

What is claimed is:

1. A method for providing accounting services by an accounting service provider to a subscriber, the method comprising:

providing a first accounting application software having a business model identification engine and configured to communicate with a first database for storing subscriber specific onboarding data and transactional data wherein the business model identification engine is configured to assign one or more business models selected from a set of standard business models to the subscriber;

providing a second accounting application software configured to communicate and synchronize with a second database for storing subscriber specific transactional data and wherein the first and second databases communicate and synchronize with each other through an API provided by the first software;

assigning one or more business models to the subscriber by processing subscriber specific onboarding data using the business model identification engine wherein each business model is associated with a model specific chart of accounts and a model specific accounting transaction guidance;

inputting subscriber specific transactional data to at least one of the model specific chart of accounts using the first accounting software, and the second accounting software;

processing subscriber specific transactional data using the first accounting application software wherein the processing step comprises routing transactional data through at least one of an accounting playbook module customized to the one or more assigned business models, an AI/ML learning module, an accountant review module, and a supervisory review module;

assigning an accounting code for each subscriber specific transaction and flagging each transaction for further oversight review using at least one of the accountant module and the supervisory review module based on at least one of materiality factor and statistical error associated with the coding assignment; and, outputting audit-ready financial reports comprising at least one of P&L statement, balance sheet, cash flow statements, A/P summary, and A/R summary.

2. The method of claim 1 wherein the subscriber specific onboarding data comprises at least one of subscriber responses to a structured set of questions and a set of sample transactional data provided by the subscriber.

3. The method of claim 2 wherein the assigning one or more business models step comprises at least one of:

examining the responses provided by the subscriber and selecting one or more business models from a standard set of business models provided by the business model identification engine; and, comparing the sample transactional data with at least one of transactional data of other subscribers and one or more predetermined sets of reference transactional data to which one or more reference business models have been previously assigned and selecting one or more business models that correlate with the reference business models.

4. The method of claim 3 wherein the comparing step is performed using machine learning methods.

5. The method of claim 2 further comprising the step of reviewing the one or more selected models by an expert associated with the audit ready accounting service provider prior to assigning the one or more models to the subscriber.

6. The method of claim 1 wherein the set of standard business models comprises at least one of fee for time (service), flat fee (service), value-added reseller, retail online, retail fixed location(s), manufacturer, software developer, contract research and development, mining and resource exploration, aggressive growth commodity type products/services to numerous markets, aggressive growth via price competitive new products/service to large customers, aggressive growth with narrow special products/services, controlled growth with broad product/services range to many markets, controlled growth via premium priced products/services, limited growth in small niches offering superior product/service, average growth via steady development of new channels, brand identification and heavy promotion, and limited growth selling infrequently purchased products/services to numerous markets.

7. The method of claim 1 further comprising the step of periodically evaluating the subscriber's transactions to assess whether the one or more business models assigned to the subscriber during onboarding are still relevant to the subscriber or if a new business model is required.

8. The method of claim 1 wherein the first accounting application software and second application software are synchronized at subscriber specific predetermined intervals.

9. The method of claim 1 wherein the first accounting application software and second application software are synchronized by a trigger from one of the accounting playbook module, the AI/ML learning module, the accountant review module, and the supervisory review module.

10. The method of claim 9 wherein the trigger is initiated by a client specific accounting coding change.

11. The method of claim 1 wherein the accounting playbook module implements at least one of assigning an accounting code for a subscriber specific transaction, adding transactional coding details, assigning a materiality factor for each transaction, estimating a reliability of coding coefficient for each transaction, and estimating a materiality adjusted coding coefficient based on statistical errors associated with each accounting code.

12. The method of claim 1 wherein the AI/ML module implements at least one of assigning an accounting code for a subscriber specific transaction, adding transactional coding details, assigning a materiality factor for each transaction, estimating a reliability of coding coefficient for each transaction, and estimating a materiality adjusted coding coefficient based on statistical errors associated with each accounting code.

13. The method of claim 1 wherein the accountant review module implements at one of assigning an accounting code for a subscriber specific transaction, adding transactional coding details, assigning a materiality factor for each transaction, estimating a reliability of coding coefficient for each transaction, and estimating a materiality adjusted coding coefficient based on statistical errors associated with each accounting code.

14. The method of claim 1 wherein the supervisory review module implements at one of assigning an accounting code for a subscriber specific transaction, adding transactional coding details, assigning a materiality factor for each transaction, estimating a reliability of coding coefficient for each transaction, and estimating a materiality adjusted coding coefficient based on statistical errors associated with each accounting code.

15. The method of claim 1 wherein the materiality adjusted coding coefficient for each subscriber specific transaction coding originating from at least one of the accounting playbook module, an AI/ML learning module, an accountant review module, and a supervisory review module is examined to decide whether a coding change is required.

16. The method of claim 11 wherein the subscriber specific transaction account coding is flagged for further review by the at least one of the accountant module and the supervisory module based on at least one of high materiality and low assigned coding keep rates related to that transaction.

17. The method of claim 1 wherein subscriber specific transactional data coding comprises at least one of:

account class comprising at least one of asset, liability, owner's equity, and revenue expense;
account number;
amount;

account class validation based on a preliminary examination against memorized transactions stored in the first database;

account number validation based on a preliminary examination against memorized transactions stored in the first database; and amount validation based on a preliminary examination against memorized transactions stored in the first database.

18. The method of claim 1 wherein the inputting subscriber specific transactional data step comprises at least one of inputting:
   a. invoices attached to e-mails related to corporate expenses;
   b. expense information captured by a subscriber using a camera of a smart device to provide a digitized source document;
   c. transactional information generated by each subscriber associated with a subscriber and transmitted by at least one of credit/debit card magstripe readers and point of sale contactless readers in the form of at least one of an e-mail directed to a subscriber e-mail account and directly to a subscriber's credit card account or bank account;
   d. credit/debit card statements associated with each credit card associated with a subscriber;
   e. bank statements associated with each subscriber account;
   f. payroll data related to each subscriber; and,
   g. ASP accounting system memorized transactions.

19. The method of claim 18 wherein subscriber specific payroll data and memorized transactional data are input into the ASP database and synchronized with the ARASP database.

20. The method of claim 1 wherein the accountant review module implements oversight review by at least one of an accountant and bookkeeper retained by the ARASP provider.

21. A system for providing accounting service by an accounting service provider to a subscriber, the system comprising:
   an electronic device configured to run a first accounting software having a business model identification engine and configured to receive subscriber specific transactional data wherein the first software processes subscriber specific transactional data using at least one an accounting playbook module, an AI/ML learning module, an accountant review module, and a supervisory review module and wherein the business model identification engine is configured to assign one or more business models selected from a set of standard business models to the subscriber;
   a first database for storing subscriber specific onboarding data and transactional data and configured to communicate with the first accounting software; and,
   a second database for storing subscriber specific transactional data and configured to communicate with a second accounting software wherein the first and second databases communicate with each other through an API provided by the first software wherein:
      the first and second databases are synchronized at predetermined intervals using the API;
      subscriber specific transactional data is inputted to at least one of the model specific chart of accounts using the first accounting software, and the second accounting software;
      at least one of the accountant module and the supervisory oversight review module is used to review transactions flagged for review based on at least one of materiality factor and statistical error associated with the coding of a transaction; and,
      the first accounting software is configured to output audit-ready financial reports comprising at least one of P&L statement, balance sheet, cash flow statement, A/P summary, and A/R summary.

22. The system of claim 21 wherein each business model is associated with a model specific chart of accounts and model specific accounting transaction guidance.

23. The system of claim 21 wherein the accounting playbook module is customized to the one or more business models assigned by the business model identification engine.

24. The system of claim 21 wherein the electronic device comprises at least one of a smart device, a laptop computer, and a desktop computer.

25. The system of claim 21 wherein the first database comprises at least one of a relational database, NoSQL database, flat files, structured database, and any other machine-readable database.

26. The system of claim 21 wherein the second database comprises at least one of a relational database, NoSQL database, flat files, structured database, and any other machine-readable database.

* * * * *